US008096870B2

(12) United States Patent
Okada

(10) Patent No.: US 8,096,870 B2
(45) Date of Patent: Jan. 17, 2012

(54) GAMING MACHINE CAPABLE OF BET OF MONETARY VALUE AS A CONDITION FOR ACQUISITION OF INSURANCE PAY

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1097 days.

(21) Appl. No.: 11/940,966

(22) Filed: Nov. 15, 2007

(65) Prior Publication Data

US 2008/0119262 A1 May 22, 2008

Related U.S. Application Data

(63) Continuation-in-part of application No. 10/268,725, filed on Oct. 11, 2002, now abandoned, and a continuation-in-part of application No. 10/263,820, filed on Oct. 4, 2002, now abandoned, and a continuation-in-part of application No. 10/262,106, filed on Oct. 2, 2002, now abandoned, and a continuation-in-part of application No. 10/261,769, filed on Oct. 2, 2002, now Pat. No. 7,465,232.

(60) Provisional application No. 60/907,680, filed on Apr. 13, 2007.

(30) Foreign Application Priority Data

| | | |
|---|---|---|
| Oct. 2, 2001 | (JP) | 2001-306773 |
| Oct. 2, 2001 | (JP) | 2001-306774 |
| Oct. 5, 2001 | (JP) | 2001-309825 |
| Oct. 12, 2001 | (JP) | 2001-315488 |

(51) Int. Cl.
*G06F 13/00* (2006.01)

(52) U.S. Cl. ........... 463/20; 463/16; 463/42; 273/138.1; 273/138.2; 273/143 R

(58) Field of Classification Search .................... 463/16, 463/20, 25, 42; 273/138.1, 138.2, 143 R
See application file for complete search history.

(56) References Cited

U.S. PATENT DOCUMENTS 4,283,709 A 8/1981 Lucero et al.
(Continued)

FOREIGN PATENT DOCUMENTS

DE 3242890 5/1984
(Continued)

OTHER PUBLICATIONS

Macau Official Action and Search Report, English translations included, dated Oct. 22, 2009.

*Primary Examiner* — Peter DungBa Vo
*Assistant Examiner* — Ryan Hsu
(74) *Attorney, Agent, or Firm* — NDQ&M Watchstone LLP

(57) ABSTRACT

A display displays a frame of image associated with a unit game, a counter to be reset under a prescribed condition increments a count value along with execution of the unit game, and a controller determines by an external input an upper limit of a number of bet pieces of monetary value as a condition for acquisition of an insurance pay in the unit game, pays out a prescribed number of pieces of monetary value for the play result of the unit game to be a special play result, accepts, within a range of the upper limit of the number of bet pieces, a bet of monetary value as the condition for acquisition of the insurance pay, and gives the insurance pay for the count value having reached a preset upper limit count value in the unit game having the bet of monetary value as the condition for acquisition of the insurance pay.

5 Claims, 16 Drawing Sheets

U.S. PATENT DOCUMENTS

| | | | | |
|---|---|---|---|---|
| 4,624,459 | A | 11/1986 | Kaufman | |
| 4,669,731 | A | 6/1987 | Clarke | |
| 4,837,728 | A | 6/1989 | Barrie et al. | |
| 4,964,638 | A | 10/1990 | Ishida | |
| 5,178,390 | A * | 1/1993 | Okada | 273/143 R |
| 5,280,909 | A | 1/1994 | Tracy | |
| 5,564,700 | A | 10/1996 | Celona | |
| 5,611,730 | A | 3/1997 | Weiss | |
| 5,639,088 | A | 6/1997 | Schneider et al. | |
| 5,695,402 | A | 12/1997 | Stupak | |
| 5,702,303 | A | 12/1997 | Takemoto et al. | |
| 5,770,533 | A | 6/1998 | Franchi | |
| 5,820,459 | A | 10/1998 | Acres et al. | |
| 5,836,817 | A | 11/1998 | Acres et al. | |
| 5,836,819 | A * | 11/1998 | Ugawa | 463/30 |
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,089,980 | A | 7/2000 | Gauselmann | |
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,695,697 | B1 | 2/2004 | Okada | |
| 6,878,063 | B2 * | 4/2005 | Manfredi et al. | 463/25 |
| 6,932,704 | B2 | 8/2005 | Walker et al. | |
| 6,932,707 | B2 | 8/2005 | Duhamel | |
| 7,651,393 | B2 * | 1/2010 | Okada et al. | 463/20 |
| 7,753,775 | B2 * | 7/2010 | Yoshizawa | 463/20 |
| 7,780,521 | B2 * | 8/2010 | Inamura | 463/25 |
| 2003/0069073 | A1 | 4/2003 | Okada | |
| 2003/0224849 | A1 | 12/2003 | Geiger | |
| 2006/0068889 | A1 * | 3/2006 | Okada et al. | 463/20 |
| 2008/0254859 | A1 | 10/2008 | Fujimoto et al. | |
| 2008/0254860 | A1 | 10/2008 | Fujimoto et al. | |
| 2008/0254869 | A1 | 10/2008 | Fujimoto et al. | |
| 2008/0254872 | A1 | 10/2008 | Fujimoto et al. | |
| 2008/0254873 | A1 | 10/2008 | Fujimoto et al. | |
| 2008/0254874 | A1 | 10/2008 | Fujimoto et al. | |

FOREIGN PATENT DOCUMENTS

| | | | |
|---|---|---|---|
| DE | 3712841 | | 11/1988 |
| DE | 4137010 | | 8/1992 |
| DE | 10049444 | | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | 0184515 | | 11/2001 |
| WO | WO03/083795 | A1 | 10/2003 |
| WO | WO2004/095383 | A1 | 11/2004 |

* cited by examiner

PAYOUT TABLE

| | 1ST CREDIT | 2ND CREDIT | 3RD CREDIT |
|---|---|---|---|
|  DOUBLE DOUBLE DOUBLE DOUBLE DOUBLE | 800 | 1600 | 2400 |
| BAR BAR BAR / BAR BAR BAR / BAR BAR BAR / BAR BAR BAR / BAR BAR BAR | 60 | 120 | 180 |
| BAR BAR / BAR BAR / BAR BAR / BAR BAR / BAR BAR | 30 | 60 | 90 |
|  | 20 | 40 | 60 |
| BAR BAR BAR BAR BAR | 15 | 30 | 45 |
| ANY BAR / ANY BAR / ANY BAR / ANY BAR / ANY BAR | 5 | 10 | 15 |
| ANY 3  | 5 | 10 | 15 |
| ANY 4  | 2 | 4 | 6 |
| J J J J J | — | — | RESET TRIGGER |

GAMING MACHINE CAPABLE OF BET OF MONETARY VALUE AS A CONDITION FOR ACQUISITION OF INSURANCE PAY

CROSS REFERENCE TO RELATED APPLICATION

This application claims priority to co-pending U.S. provisional patent application Ser. No. 60/907,680 entitled "GAMING MACHINE ENABLING BET FOR GETTING INSURANCE-PAY" filed on Apr. 13, 2007 and naming Kazuo OKADA as inventor, which is incorporated by reference herein for all purposes. This application also is a continuation-in-part of co-pending U.S. patent application Ser. No. 10/261,769 filed on Oct. 2, 2002, No. 10/262,106 filed on Oct. 2, 2002, No. 10/263,820 filed on Oct. 4, 2002, and No. 10/268,725 filed on Oct. 11, 2002, which are incorporated by reference herein for all purposes.

BACKGROUND OF THE INVENTION

1. Field of the Invention

The present invention relates to a gaming machine capable of a bet of monetary value as a condition for acquisition of an insurance pay.

2. Description of Related Art

There are known gaming machines, such as slot machines, described in Specifications of, e.g., U.S. Pat. Nos. 5,820,459, 6,695,697, U.S. Patent Application Laying-Open Publication No. 2003-0,069,073, European Patent Application Laying-Open Publication No. 1,192,975, U.S. Pat. Nos. 6,254,483, 5,611,730, 5,639,088, 6,257,981, 6,234,896, 6,001,016, 6,273,820, 6,224,482, 4,669,731, 6,244,957, 5,910,048, 5,695,402, 6,003,013, 4,283,709, European Patent Application Laying-Open Publication No. 0,631,798, German Patent Application Laying-Open Publication No. 4,137,010, British Patent Application Laying-Open Publication No. 2,326,830, German Patent Application Laying-Open Publication No. 3,712,841, U.S. Pat. Nos. 4,964,638, 6,089,980, 5,280,909, 5,702,303, 6,270,409, 5,770,533, 5,836,817, 6,932,704, 6,932,707, 4,837,728, European Patent Application Laying-Open Publication No. 1,302,914, U.S. Pat. No. 4,624,459, U.S. Pat. No. 5,564,700, International Laying-Open Publication No. 03/083795, German Patent Application Laying-Open Publication No. 3,242,890, European Patent Application Laying-Open Publication No. 0,840,264, German Patent Application Laying-Open Publication No. 10,049,444, International Laying-Open Publication No. 04/095383, European Patent Application Laying-Open Publication No. 1,544,811, U.S. Pat. No. 5,890,963, European Patent Application Laying-Open Publication No. 1,477,947, and European Patent Application Laying-Open Publication No. 1,351,180.

In a facility where such a gaming machine is installed, the player is allowed, by betting a monetary value such as a coin or credit to the gaming machine, to play at a game provided by the gaming machine.

For example, at a slot machine, each time when a player who has bet a monetary value to the slot machine presses a start switch, the slot machine is caused to execute a unit game in which a plurality of symbols arranged on a display are rearranged. And, for a prescribed winning combination made by a combination of rearranged symbols on the display, the slot machine pays out a monetary value depending on the winning combination.

Further, the slot machine is adapted for a payout called Jackpot, as well. Namely, at the slot machine, part of the monetary value bet to the slot machine is accumulated as a monetary value for Jackpot. The slot machine is adapted to decide at a predetermined timing whether or not to make a payout of monetary value for Jackpot, and for a decision to make a payout, pays out an accumulated monetary value for Jackpot to the player.

The present invention has been devised in view of such points, and it is an object of the present invention to provide a gaming machine with an excellent entertainingness.

SUMMARY OF THE INVENTION

According to a first aspect of the present invention, a gaming machine capable of a bet of monetary value as a condition for acquisition of an insurance pay comprises a display configured to display an image associated with a unit game for determination of whether or not a play result for a payout is to be given, a counter configured to be reset under a prescribed condition, and to increment a count value along with execution of the unit game, an upper limit setting switch configured to set an upper limit of a number of bet pieces of monetary value as a condition for acquisition of an insurance pay in the unit game, and a controller operable to (a) pay out a prescribed number of pieces of monetary value for the play result of the unit game to be a special play result, (b) accept, within a range of the upper limit of the number of bet pieces, a bet of monetary value as the condition for acquisition of the insurance pay, and (c) give the insurance pay for the count value having reached a preset upper limit count value in the unit game having the bet of monetary value as the condition for acquisition of the insurance pay.

According to a second aspect of the present invention, a gaming machine capable of a bet of monetary value as a condition for acquisition of an insurance pay comprises a display configured to display an image associated with a unit game for determination of whether or not a play result for a payout is to be given, a counter configured to be reset under a prescribed condition, and to increment a count value along with execution of the unit game, an upper limit setting switch configured to set an upper limit of a number of bet pieces of monetary value as a condition for acquisition of an insurance pay in the unit game, and a controller operable to (a) pay out a prescribed number of pieces of monetary value for the play result of the unit game to be a special play result, (b) make a setting operation of the upper limit by the upper limit setting switch effective under a condition of a special key operation, (c) accept, within a range of the upper limit of the number of bet pieces, a bet of monetary value as the condition for acquisition of the insurance pay, and (d) give the insurance pay for the count value having reached a preset upper limit count value in the unit game having the bet of monetary value as the condition for acquisition of the insurance pay.

According to a third aspect of the present invention, a gaming machine capable of a bet of monetary value as a condition for acquisition of an insurance pay comprises a display configured to display an image associated with a unit game for determination of whether or not a play result for a payout is to be given, a counter configured to be reset under a prescribed condition, and to increment a count value along with execution of the unit game, an upper limit setting switch operable by a player and configured to set an upper limit of a number of bet pieces of monetary value as a condition for acquisition of an insurance pay in the unit game, and a controller operable to (a) pay out a prescribed number of pieces of monetary value for the play result of the unit game to be a special play result, (b) accept, within a range of the upper limit of the number of bet pieces, a bet of monetary value as the condition for acquisition of the insurance pay, and (c) give the insurance pay for the count value having reached a preset upper limit count value in the unit game having the bet of monetary value as the condition for acquisition of the insurance pay.

According to a fourth aspect of the present invention, a gaming machine capable of a bet of monetary value as a condition for acquisition of an insurance pay comprises a display configured to display an image associated with a unit game for determination of whether or not a play result for a payout is to be given, a counter configured to be reset under a prescribed condition, and to increment a count value along with execution of the unit game, and a controller operable to (a) pay out a prescribed number of pieces of monetary value for the play result of the unit game to be a special play result, (b) accept a bet of an arbitrary number of pieces of monetary value as a condition for acquisition of an insurance pay, and (c) give the insurance pay to pay out a number of pieces of monetary value depending on the number of bet pieces of monetary value as the condition for acquisition of the insurance pay for the count value having reached a preset upper limit count value in the unit game having the bet of monetary value as the condition for acquisition of the insurance pay.

According to a fifth aspect of the present invention, a gaming machine capable of a bet of monetary value as a condition for acquisition of an insurance pay comprises a display configured to display an image associated with a unit game for determination of whether or not a play result for a payout is to be given, a counter configured to be reset under a prescribed condition, and to increment a count value along with execution of the unit game, and a controller operable to (a) pay out a prescribed number of pieces of monetary value for the play result of the unit game to be a special play result, (b) accept a bet of an arbitrary number of pieces of monetary value as a condition for acquisition of an insurance pay, (c) determine an upper count value at the counter depending on the number of bet pieces of monetary value as the condition for acquisition of the insurance pay, and (d) give the insurance pay to pay out a number of pieces of monetary value depending on the number of bet pieces of monetary value as the condition for acquisition of the insurance pay for the count value having reached the upper limit count value in the unit game having the bet of monetary value as the condition for acquisition of the insurance pay.

DETAILED DESCRIPTION OF THE EMBODIMENT

Figure 1:
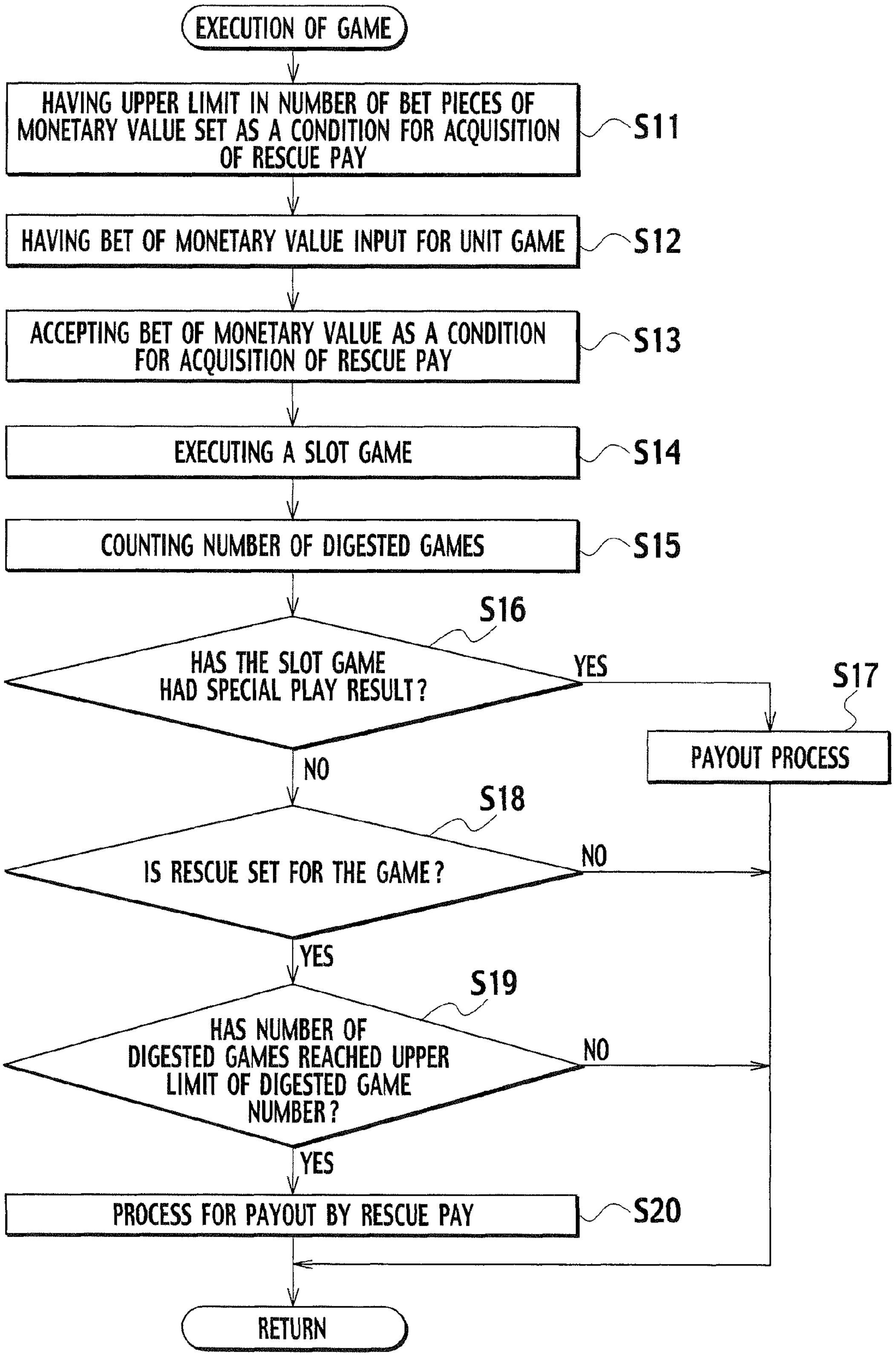
FIG. 1 is a flowchart of an outlined processing procedure of a slot machine according to an embodiment of the present invention.

There will be described an outline of actions of a slot machine 10 as a gaming machine according to an embodiment of the present invention, with reference to a flowchart shown in FIG. 1 and a perspective view of the slot machine 10 shown in FIG. 2.

The slot machine 10 according to the present embodiment first (at a step S11) has an upper limit of a bet amount in terms of a monetary value set as a condition for acquisition of an insurance pay (referred herein to "rescue pay"). For the rescue pay as well as the insurance pay, a trademark registration request is applied. As used herein, the term "monetary value" is a collective term of a medal, coin, bill, or token, or an electronic money or electronic valuable piece of information (as a credit) corresponding thereto.

The term "rescue pay" means a payout of monetary value, such as by a prescribed number of pieces of medal or credit (e.g. 360 pieces of medal, or credits equivalent to 360 medals), for a number of unit games accompanied by no occurrences of a predetermined payout amount (e.g. payout of 60 pieces or more per one bet), having reached an upper limit in number of games (e.g. 1,000 games), or for a number of consecutive unit games accompanied by no occurrences of a predetermined payout amount, having reached an upper limit in number of bet pieces of medal or credit (e.g. 3,000 medals or equivalent).

The upper limit in number of bet pieces of monetary value as a condition for acquisition of a rescue pay may be preset by a manager of a casino where the slot machine 10 is installed, or may be set up by a player himself or herself, as the player wants.

Next (at a step S12), for a unit game being a segment of execution of respective slot game, a bet of monetary value is input.

Thereafter (at a step S13), for rescue pay, a bet of monetary value is accepted. According to the present invention, within a range not exceeding the upper limit set in a process at the step S11, a monetary value for rescue pay can be bet. And, with a monetary value bet for rescue pay, the unit game is set as a rescue setting game.

Next (at a step S14), a slot game is executed. In the slot game, a start switch is pressed by the player, whereby, in a total number of fifteen display regions Q in a matrix of three rows by five columns, symbols scroll and thereafter stop. When they are stopped, the display regions Q have a combination of symbols displayed thereon as a result of play of the slot game. If this has a winning combination, a payout will be made of a monetary value depending on the winning combination.

Thereafter (at a step S15), the number of digested unit games (or the number of consumed pieces of credit) is counted. Further (at a step S16), it is judged whether or not the play result of slot game is a special play result. As the "special play result", there may be, e.g., such a case that gives a payout of 60 pieces or more per one credit. More specifically, it corresponds to a case in which symbols of a (special symbol) "DOUBLE" shown in FIG. 16 or of a (special symbol) "TRIPLE BAR" are arranged, five in number, on a central payline L1.

If it is any special play result ('YES' at the step S16), then the number of digested unit games (or the number of consumed pieces of credit) counted at the step S15 is reset, for a payout to be made (at a step S17) of a monetary value corresponding to the special play result.

On the other hand, unless it is any special result ('NO' at the step S16), then a judgment is made (at a step S18) as to whether or not a rescue is set for the current game. If a rescue is set for the game, then it is judged (at a step S19) whether or not the number of digested games has reached an upper limit of game number (upper limit of count value). And, if the digested game number has reached the upper limit of game number, a payout will be made (at a step S20) of a prescribed number of pieces of monetary value (e.g. 360 pieces of medal or equivalent). Or, it is judged whether or not the number of consumed pieces of credit has reached an upper limit number, and if the consumed credit number has reached the upper limit number, a payout will be made of a prescribed number of pieces of monetary value.

Such being the case, there is a preset upper limit in number of bet pieces of monetary value for rescue pay, and the player can bet a monetary value for rescue pay within a range under the upper limit. And, during a rescue-set game, if the digested game number has reached an upper limit of game number, or if the consumed credit number has reached an upper limit number, then a payout is made as a rescue pay by a prescribed number of pieces of monetary value.

Description is now made into details of configuration of the slot machine 10 according to the present embodiment. As shown in FIG. 2, the slot machine 10 according to the present embodiment has a cabinet 11, a top box 12 provided on an upside of the cabinet 11, and a main door 13. The cabinet is provided with a lower LCD (liquid crystal display) 16 at the side facing the player. Further, the cabinet 11 has various incorporated components including a controller 40 (refer to FIG. 3) for electrical control of the slot machine 10, a hopper 44 (refer to FIG. 3) for control of medal insertion, storage, and payout, etc.

Further, in the present embodiment, there is exemplified a medal as a monetary value to be employed for execution of game. However, the monetary value is not limited to the medal, and may be, e.g., a coin, token, electronic money, or electronic valuable information (credit) corresponding thereto.

The main door 13 is attached to the cabinet 11, allowing opening and closing. Substantially at a central part of the main door 13, the lower LCD 16 is provided. The lower LCD 16 can display frames of image of various games including a slot game, as will be described. In the slot game, it has symbols arranged in three-rows by five-columns of a total number of fifteen display regions Q, changed, and then rearranged. Symbols rearranged in the display regions Q sometimes have a winning combination (refer to FIG. 16), when a payout is made by a prescribed number of pieces of monetary value (medal, credit, etc.).

Below the lower LCD 16, there are provided a medal slot 21 configured for insertion of medals to be used when playing a game, and a bill validator 22 adapted to validate a bill to be adequate or not, and accept a legitimate bill. Further, near the medal slot 21 and the bill validator 22, there are various operational switches.

Those operational switches include a cashout switch 23, a max-bet switch 24, a bet switch 25, a rescue-pay-capable max-bet switch 26, a rescue-pay bet switch 31, and a start switch 27. Designated at 47 is a call switch.

The bet switch 25 is adapted as a switch to determine the number of pieces of credit to be bet for a slot game to be played on the lower LCD 16, and causes a credit equivalent to one piece of medal to be bet, each time when it is pressed.

The max-bet switch 24 serves as a switch for betting, by a single operation, a maximal number of pieces of credit (equivalent to three pieces of medal, for example) that can be bet for a single time of slot game. It is noted that the maximal number of pieces of credit bettable for a single time of slot game can be changed by operation of a controller, permitting a bet of, e.g., fifty pieces of medal or equivalent as the maximum.

The rescue-pay-capable max-bet switch 26 is adapted as a switch for a single operation to bet a maximal number of pieces of credit that can be bet for a single time of slot game, and to bet a prescribed number of pieces of credit for a rescue pay. For example, it causes, by a single operation, a credit equivalent to three pieces of medal to bet for a slot game, and a credit equivalent to one piece of medal to be bet for a rescue pay.

The rescue-pay bet switch 31 is operable as a switch to bet a credit for a rescue pay. Each time when the rescue-pay bet switch 31 is pressed, such a credit that is equivalent to one piece of medal is bet as a credit for a rescue pay.

The start switch 27 is adapted as a switch to start a slot game on the lower LCD 16, after a credit is bet. With a medal inserted into the medal slot 21, or a credit bet by the bet switch 25, max-bet switch 24, or rescue-pay-capable max-bet switch 26, the start switch 27 pressed thereafter causes a slot game to be started on the lower LCD 16.

The cashout switch 23 is adapted as a switch to pay out an inserted medal, and the medal to be paid out is discharged from a medal payout port 28 opening in a lower front portion of the main door 13, so that the paid out medal is accumulated in a medal tray 18.

The main door 13 has a foot display 34 provided at the front of a lower part thereof, for displaying thereon a variety of image frames associated with a game at the slot machine 10. Those image frames may involve, e.g., characters of the slot machine 10 or the like. Below the foot display 34, the medal payout port 28 is disposed.

The top box 12 has an upper LCD (liquid crystal display) 33 provided at the front. The upper LCD 33 displays thereon numbers of pieces of medal payable to symbol combinations, as well as image frames for rendition or else.

Further, in the top box 12, a speaker 29 is provided. Below the upper LCD 33, there are provided a ticket printer 35, a card reader 36, a data display 37, and a keypad 38. The ticket printer 35 is adapted to print a bar code, in which various data on the number of pieces of credit, date and time, slot machine 10's identification number, etc. are coded, on a ticket to be output as a bar-coded ticket 39.

With a bar-coded ticket 39, the player is allowed among others to play at another slot machine by letting this slot machine read it, or to cash it to bills or such at a prescribed station in the gaming facility (e.g., at a cashier in the casino).

The card reader 36 is adapted to accept a smart card to be inserted thereto, read a data from an inserted smart card, and write a data to a smart card. The smart card is a card to be carried by a player, and is adapted to store therein a data for identification of the player, data on a history of games the player has played, and the like.

Figure 3:
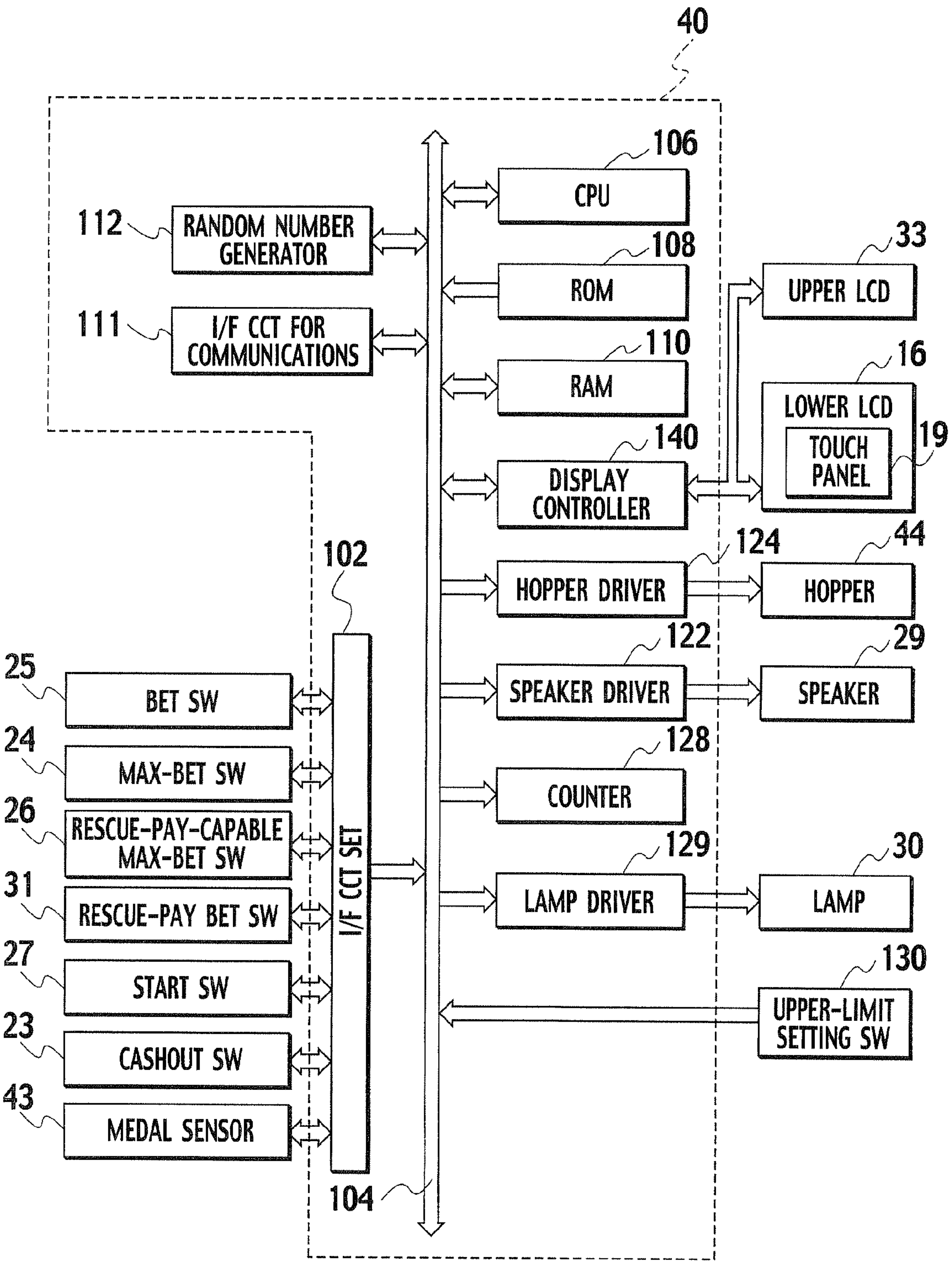
FIG. 3 is a block diagram of control circuitry of a slot machine according to an embodiment of the present invention.

FIG. 3 shows, in a block diagram, electrical configuration of the controller 40, and various devices connected to the controller 40, in the slot machine 10 according to the present embodiment. For the slot machine 10 shown in FIG. 3, the controller 40 is composed of a microcomputer, including a set of I/F (interface) circuits 102, an I/O (input/output) bus 104, a CPU (central processing unit) 106 as a main, a ROM (read only memory) 108, a RAM (random access memory) 110, an I/F circuit 111 for communications, a random number generator 112, a speaker driver 122, a hopper driver 124, a counter 128, a display controller 140, and a lamp driver 129.

The I/F circuit set 102 is connected to the I/O bus 104, which is configured to transmit data and address signals to and from the CPU 106.

The I/F circuit set 102 is connected to the start switch 27. The start switch 27 outputs a start signal, which is transformed, in the I/F circuit set 102, to a prescribed signal to be transmitted through the I/O bus 104 to the CPU 106.

Further, the I/F circuit set 102 is connected to the bet switch 25, max-bet switch 24, rescue-pay-capable max-bet switch 26, rescue-pay bet switch 31, and cashout switch 23. These switches 23 to 26 and 31 have their switching signals, which are output therefrom and supplied to the I/F circuit set 102, where they are transformed to prescribed signals to be transmitted through the I/O bus 104 to the CPU 106.

In addition, the I/F circuit set 102 is connected to a medal sensor 43. The medal sensor 43 is adapted as a sensor for detection of a medal inserted into the medal slot 21, and provided at a medal insert part of the medal slot 21. The medal sensor 43 outputs a detection signal, which is supplied to the I/F circuit set 102, where it is transformed to a prescribed signal to be transmitted through the I/O bus 104 to the CPU 106.

The I/O bus 104 is connected to the ROM 108, in which a system program is stored, and the RAM 110, which holds various data. Further, the I/O bus 104 is connected to the random number generator 112, I/F circuit 111 for communications, display controller 140, hopper driver 124, speaker driver 122, and counter 128.

The CPU 106 is adapted for reading a game execution program to execute a slot game, taking as the timing an acceptance of a start operation for the game by the start switch 27. The game execution program is a program for executing a slot game on the lower LCD 16 through the display controller 140.

In other words, the game execution program is programmed to execute such a slot game that has on the display regions Q (refer to FIG. 2) symbols scrolling and, thereafter, symbols stopped (i.e., symbols rearranged anew after a previous symbol arrangement), and has a payout occur, given a combination of symbols constituting a winning combination by the stopped symbols.

The I/F circuit 111 for communications may be connected to a hole server or the like, for transmission of data thereto, such as on a history of games played at the slot machine 10, as well as for reception of various data therefrom.

The random number generator 112 generates a random number for use to determine whether or not a winning combination is to occur in a slot game to be played on the lower LCD 16.

The counter 128 has a function of counting the number of execution times of a unit game, that is, the number of times a slot game has been played on the display regions Q (the number of digested games), a function of counting the number of bet pieces of monetary value (e.g., the number of inserted pieces of medal) for consecutively executed slot games, and a function of counting a difference in number of pieces between the number of bet pieces (e.g., inserted pieces) and the number of paid-out pieces of monetary value (e.g., medal) during consecutively executed slot games. As used herein, "the number of bet pieces of monetary value for consecutively executed slot games" means a cumulative number of bet pieces (e.g., inserted pieces) of monetary value (e.g., medal). This amounts to, for example, thirty pieces in the case of a slot game that has been executed ten times, with three pieces of medal bet for each time. Further, "the difference in number of pieces between the number of bet pieces and the number of paid-out pieces of monetary value during consecutively executed slot games" means a number of pieces corresponding to a difference between a cumulative number of bet pieces (e.g., inserted pieces) and a cumulative number of paid-out pieces of monetary value (e.g., medal). This comes to, for example, twenty pieces in the case of a slot game that has been executed ten times, with three pieces of medal bet for each time, having a total number of ten pieces of medal (or a credit equivalent thereto) paid out during the ten slot games. It is noted that the counter 128 may be set in the RAM 110.

The speaker driver 122 outputs audio data to the speaker 29. That is, the CPU 106 reads audio data stored in the ROM 108, which are transmitted through the I/O bus 104 to the speaker driver 122. The speaker 29 is thereby driven to produce prescribed sound effects.

The hopper driver 124 outputs a payout signal to the hopper 44, upon an occurrence of cashout demand. That is, with a cashout signal input from the cashout switch 23, the CPU 106 outputs a drive signal through the I/O bus 104 to the hopper driver 124. The hopper 44 is thereby driven to pay out an amount of medals corresponding to a residual number of pieces of credit that the ROM 108 then has stored in a prescribed memory region thereof.

The display controller 140 performs a control for display to have a slot game played on the lower LCD 16. That is, the CPU 106 works in accordance with developments as well as a result of the slot game, to generate signals for commands to display image frames, and output the command signals through the I/O bus 104 to the display controller 140. With such command signals input from the CPU 106, the display controller 140 responds thereto by generating drive signals for driving the lower LCD 16, and outputs the drive signals to the lower LCD 16. The lower LCD 16 is thereby driven to display thereon various frames of images, such as images for rendition, and images for description of the game.

Further, the lower LCD 16 has a touch panel (paneled system of touch sensors) 19 arranged on an obverse side thereof, which is operated by a player's touch thereto to detect a contact position on the lower LCD 16, of which a detection data is transmitted to the CPU 106.

Further, the display controller 140 performs a display control to display, on the upper LCD 33, a variety of frames of images, such as images for rendition, and images for description of the game.

The lamp driver 129 is adapted for a rotary display control of a lamp 30 at the top of the slot machine 10. That is, the lamp 30 has a rotary reflector built therein, and the lamp driver 129 controls the lamp 30 to turn on, rotating the reflector.

Further, the I/O bus 104 is connected to an upper-limit setting switch 130 for setting an upper limit of monetary value bettable for rescue pay. The upper-limit setting switch 130, installed inside the main door 13, permits an access to change the setting, by a dedicated key possessed by a controller of the casino where the slot machine is installed. That is, the upper-limit setting switch 130 can be operated simply by a controller of the casino holding the dedicated key. It is noted that the key may be substituted by a code number to be input, a fingerprint to be authenticated, an identification card, or the like.

Description is now made of procedures as flows of control processes associated with an initial setting for and execution of a unit game, which constitutes a delimiter in a play of slot game, at the slot machine 10 as a gaming machine according to a first mode of embodiment of the present invention, with references made to flowcharts of FIG. 4 to FIG. 11.

Figure 4:
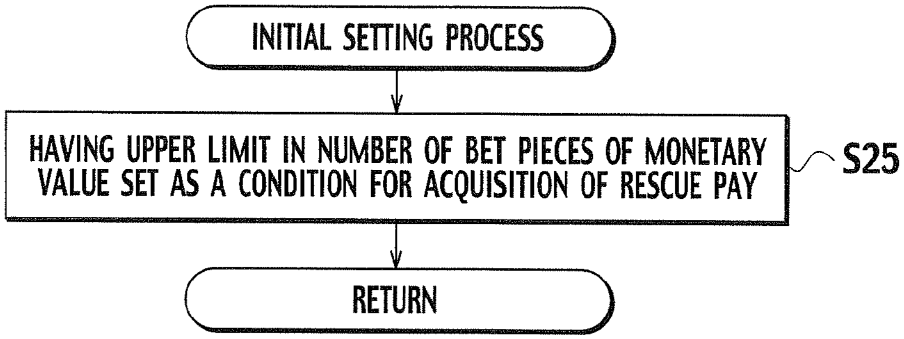
FIG. 4 is a flowchart of procedure of a process of a slot machine according to an embodiment of the present invention.

As shown in FIG. 4, first of all, there is an initial setting process to be implemented before execution of the unit game at the slot machine 10. In the initial setting process, at a step S25, a controller of the casino where the slot machine 10 is installed sets up an upper limit in number of pieces of monetary value that can be bet for a rescue pay. For this setting, the casino's controller is permitted to use a dedicated key to have an access for operation to the upper-limit setting switch 130 installed inside the main door 13. The controller may set up, e.g., ten pieces of medal or an equivalent as an upper limit of monetary value bettable in a single time of unit game. Then, the present process goes to an end.

Figure 5:
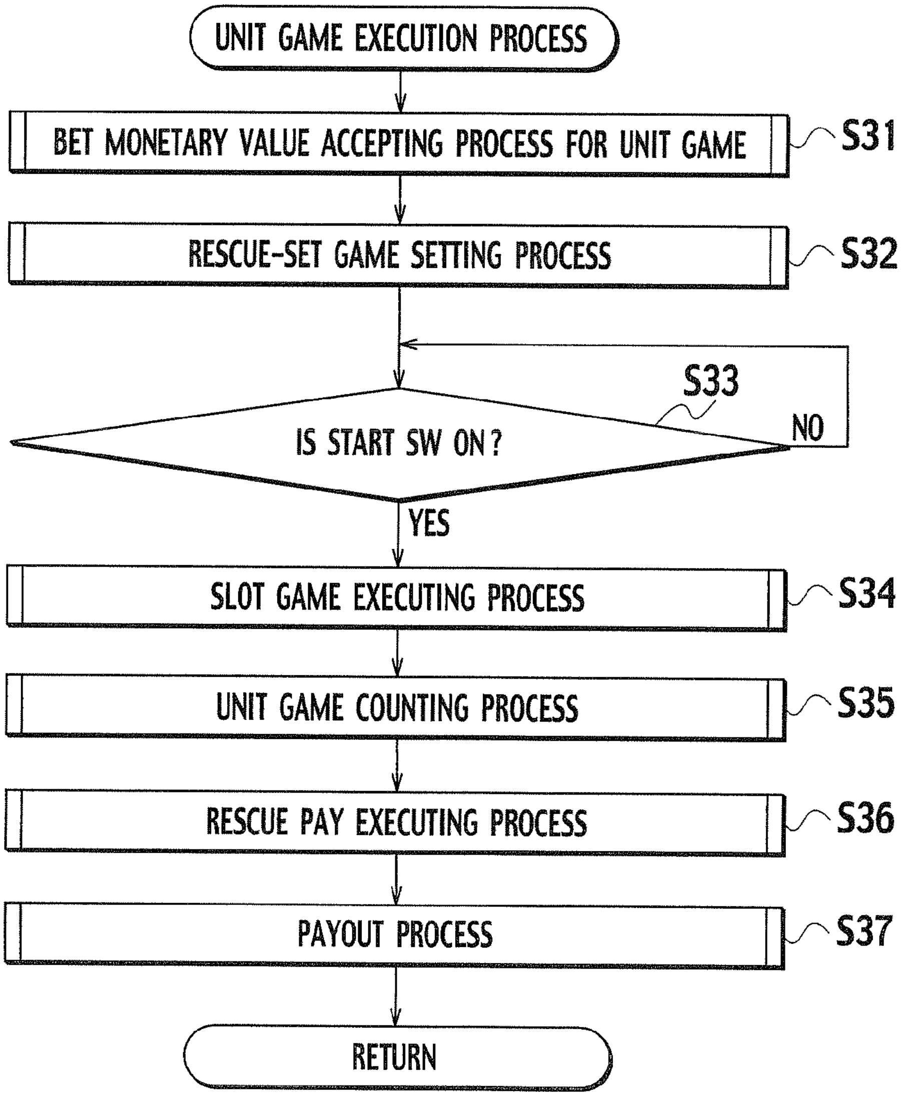
FIG. 5 is a flowchart of procedure of a process of a slot machine according to an embodiment of the present invention.

FIG. 5 shows, in a flowchart, a procedure of processes associated with execution of a unit game to be implemented after the setting of an upper limit of monetary value bettable in the unit game.

Upon entry to execution of the unit game, at a step S31 in FIG. 5, the CPU 106 shown in FIG. 3 performs a process of accepting a bet monetary value. More specifically, the CPU 106 detects a number of pieces of medal inserted through the medal slot 21, or that of credit bet by pressing the max-bet switch 24, the bet switch 25, or the rescue-pay-capable max-bet switch 26. Details will be described with reference to a flowchart of FIG. 6.

Next, at a step S32, the CPU 106 performs a rescue-set game setting process. In this process, for a rescue-set game (i.e., rescue-pay-bet game or rescue-pay-set game) to be set, it is judged whether or not a credit is bet for rescue pay by pressing the rescue-pay-capable max-bet switch 26 or the rescue-pay bet switch 31. Details will be described with reference to a flowchart of FIG. 7.

Thereafter, at a step S33, it is judged whether or not the start switch 27 is turned on. If the start switch 27 is turned on, the process flow goes to a step S34.

At the step S34, the CPU 106 performs a slot game executing process. For this process, details will be described with reference to a flowchart of FIG. 8. Thereafter, the process flow goes to a step S35.

At the step S35, the CPU 106 performs a unit game counting process. In this process, the counter 128 has a count thereof incremented every time of execution of unit game. Details will be described with reference to a flowchart of FIG. 9.

At a step S36, the CPU 106 performs a rescue pay executing process. In this process, a flag is set to cause a payout by a specified number of (e.g. 360) pieces of medal, for no occurrences of a payout by a prescribed number of or more pieces (e.g., 60 or more pieces of medal or an equivalent) during a prescribed number of (e.g., 1,000) times of execution of unit game. Details will be described with reference to a flowchart of FIG. 10.

At a step S37, the CPU 106 performs a payout process. In this process, a payout is made by a monetary value (medal, credit, etc.), if symbols stopped in the three rows by five columns of display regions Q give a winning combination, or if a flag is set to cause a rescue pay. Thereafter, the process flow will be called for a subsequent unit game.

Figure 6:
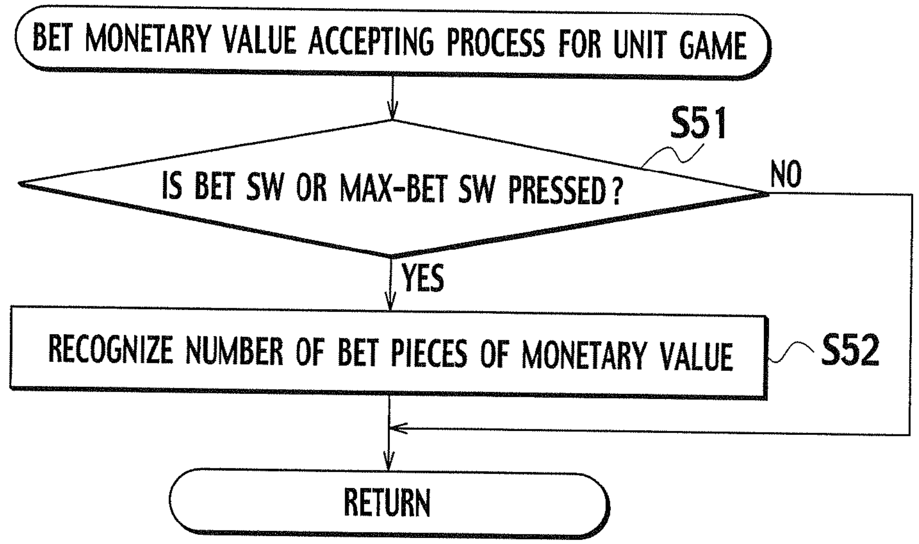
FIG. 6 is a flowchart of procedure of a process of a slot machine according to an embodiment of the present invention.

Description is now made of a procedure as a control flow of the bet monetary value accepting process for rescue pay at the step S31 in FIG. 5, with reference to the flowchart of FIG. 6.

First, at a step S51, the CPU 106 judges whether or not the bet switch 25 or the max-bet switch 24 is pressed. If the bet switch 25 or the max-bet switch 24 is pressed, then at a step S52, the CPU 106 recognizes a number of pieces of monetary value bet by pressing the bet switch 25 or the max-bet switch 24. For example, assuming a maximal number of pieces bettable for a single time of unit game to have been determined as an amount of three pieces of medal or an equivalent, the CPU 106 recognizes a monetary value equivalent to three pieces of medal having been bet when the max-bet switch 24 is pressed. Thereafter, the present process goes to an end.

Figure 7:
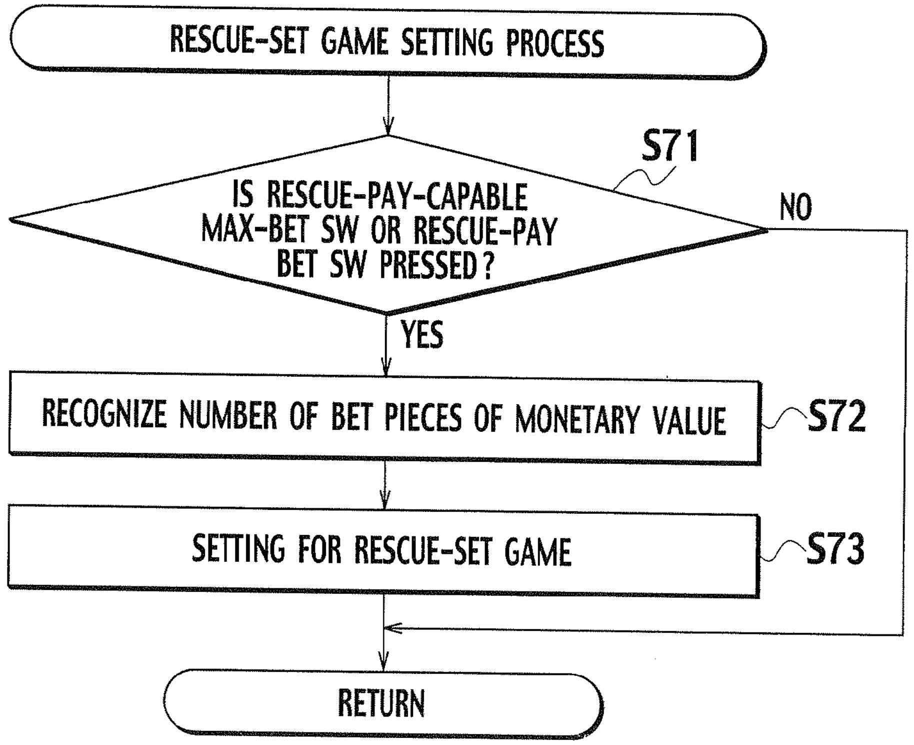
FIG. 7 is a flowchart of procedure of a process of a slot machine according to an embodiment of the present invention.

Description is now made of a procedure as a control flow of the rescue-set game setting process at the step S32 in FIG. 5, with reference to the flowchart of FIG. 7.

First, at a step S71, the CPU 106 judges whether or not the rescue-pay-capable max-bet switch 26 or the rescue-pay bet switch 31 is pressed. If the rescue-pay-capable max-bet switch 26 or the rescue-pay bet switch 31 is then pressed, the process flow goes to a step S72. At the step S72, the CPU 106 recognizes a number of bet pieces of monetary value for rescue pay. That is, the CPU 106 recognizes a monetary value equivalent to, e.g., one piece of medal as a bet for rescue pay, if the rescue-pay-capable max-bet switch 26 is pressed. If the rescue-pay bet switch 31 is pressed, the monetary value to be recognized as a bet for rescue pay depends on the number of times the rescue-pay bet switch 31 is pressed.

Then, at a step S73, the CPU 106 sets this unit game as a rescue-set game. Thereafter, the present process goes to an end.

Figure 8:
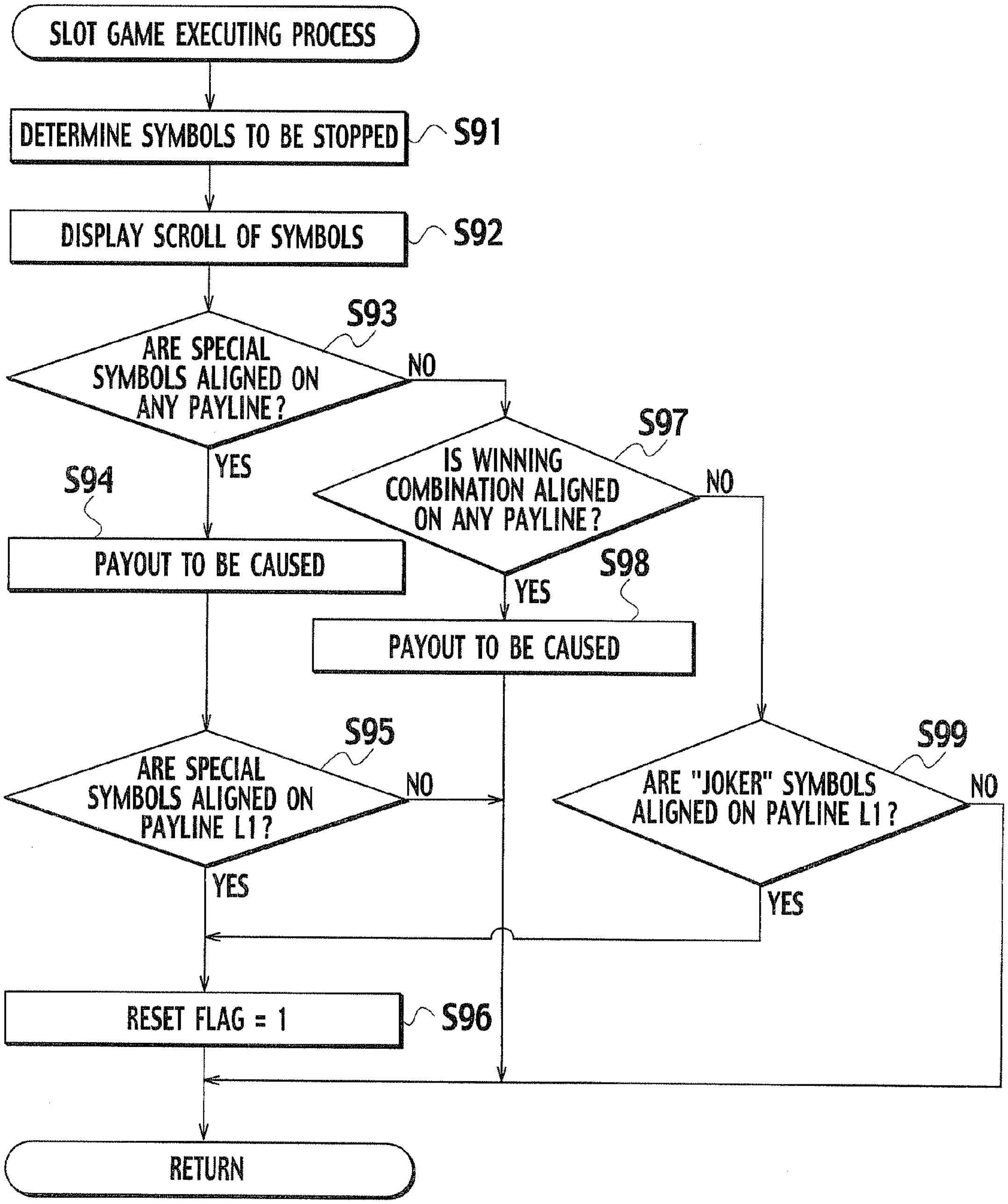
FIG. 8 is a flowchart of procedure of a process of a slot machine according to an embodiment of the present invention.

Description is now made of a procedure as a control flow of the slot game executing process at the step S34 in FIG. 5, with reference to the flowchart of FIG. 8.

First, at a step S91, the CPU 106 determines symbols to be stopped on three rows by five columns of a total number of fifteen display regions Q, depending on a random number generated by the random number generator 112 (refer to FIG. 3). Then, at a step S92, it displays scroll of symbols on the display regions Q for a prescribed time (e.g., five seconds), and thereafter, has stopped symbols displayed thereon. The symbols to be stopped are those determined at the step S91. Thereafter, the process flow goes to a step S93.

At the step S93, the CPU 106 judges whether or not special symbols are aligned on any one of an upper payline L2, a central payline L1, and a lower payline L3 set on the three rows by five columns of display regions Q. Aligned special symbols constitute a winning combination that causes a monetary value equivalent to, e.g., sixty pieces of medal to be paid out to a bet monetary value equivalent to one piece of medal.

Figure 16:
FIG. 16 is a payout table describing relationships between winning combinations and payouts of a slot machine according to an embodiment of the present invention.
Figure 16:
Figure 16:
Figure 16:

FIG. 16 shows a payout table, where winning combinations are specified. More specifically, five "DOUBLE" symbols, if aligned on any one of paylines L1 to L3, cause a payout of 800 pieces of credit per one piece of credit, and five "triple BAR" symbols, if aligned on any one of paylines L1 to L3, cause a payout of 60 pieces of credit per one piece of credit. Further, there are payouts specified in correspondence to aligned five "double BAR" symbols, aligned five "CHERRY" symbols, aligned five "single BAR" symbols, and aligned five "any BAR" (any of "triple BAR", "double BAR", and "single BAR") symbols, as well as to appearing four "CHERRY" symbols, and appearing three "CHERRY" symbols.

In this embodiment, the "DOUBLE" symbol and the "triple BAR" symbol are each respectively referred to a special symbol. If special symbols are aligned on any one of paylines L1 to L3, the process flow goes to a step S94. Unless special symbols are aligned on any one of paylines L1 to L3, the process flow goes to a step S97.

At the step S94, the CPU 106 sets a flag for a payout to be caused by aligned special symbols on any one of paylines L1 to L3. Thereafter, the process flow goes to a step S95.

At the step S95, it is judged whether or not the special symbols are aligned on the central payline L1 among paylines L1 to L3. If those special symbols are aligned on the central payline L1, the process flow goes to a step S96. Unless the special symbols are aligned on the central payline L1, that is, if those special symbols are aligned on either upper payline L2 or lower payline L3, the present process goes to an end.

At the step S96, a reset flag is set to "1", for resetting the number of times of execution of unit game counted by the counter 128 (refer to FIG. 3). Thereafter, the present process goes to an end.

In other words, along a flow of processes at steps S94 to S96, if special symbols are aligned on any one of paylines L1 to L3, the CPU 106 provides for a payout to be caused by the aligned special symbols, and simply when the special symbols are aligned on the central payline L1, it sets the reset flag to "1".

On the other hand, at the step S97, the CPU 106 judges whether or not a winning combination is aligned on any one of paylines L1 to L3. Namely, it is judged whether or not a winning combination of symbols else than special symbols is aligned. If a winning combination is aligned, then at a step S98, the CPU 106 sets a flag for a payout to be caused by the winning combination. For example, if five "CHERRY" symbols are aligned on any one of paylines L1 to L3, the CPU 106 provides for a payout of a monetary value equivalent to 20 pieces of medal per one piece of credit. Unless a winning combination is aligned on any one of paylines L1 to L3, the process flow goes to a step S99.

At the step S99, the CPU 106 judges whether or not "JOKER" symbols are aligned on the payline L1. As shown in the payout table of FIG. 16, aligned "JOKER" symbols constitute a reset trigger, which makes the process flow go to the step S96, where the reset flag is set to "1". Namely, aligned "JOKER" symbols on the payline L1 cause no payout, and set the reset flag to "1" to reset the number of times of execution of unit game counted by the counter 128 (refer to FIG. 3). Thereafter, the present process goes to an end.

Figure 9:
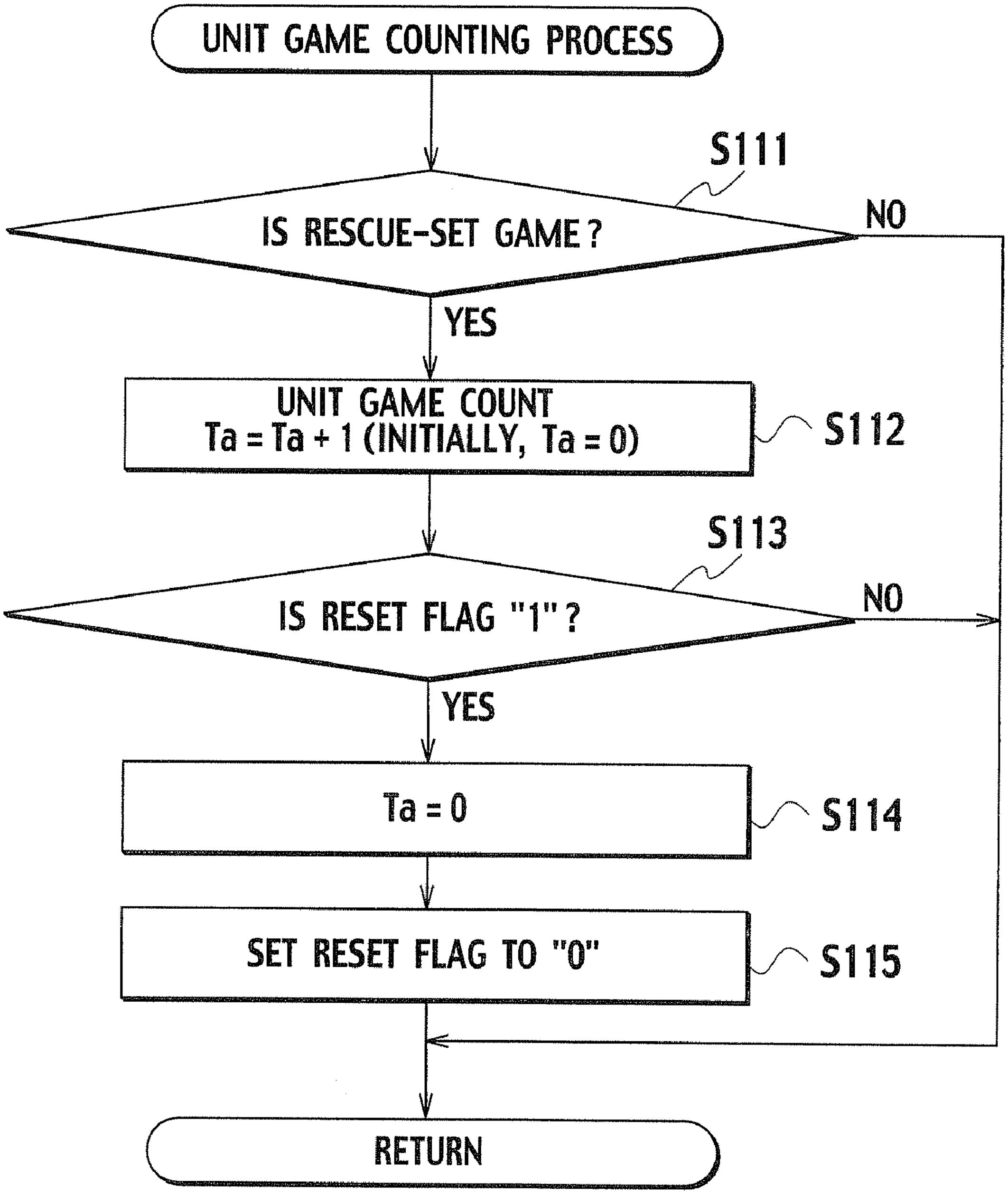
FIG. 9 is a flowchart of procedure of a process of a slot machine according to an embodiment of the present invention.

Description is now made of the unit game counting process at the step S35 in FIG. 5, with reference to the flowchart of FIG. 9.

First, at a step S111, the CPU 106 judges whether or not this unit game is a rescue-set game. Namely, there is a judgment as to whether or not it is set as a rescue-set game in the process at the step S73 in FIG. 7. If it is a rescue-set game, the process flow goes to a step S112. Unless it is a rescue-set game, the present process goes to an end.

At the step S112, the CPU 106 increments the count made of unit games. That is, letting $T_a$ be the count of a unit game, it so follows that $T_a = T_a + 1$. It is noted that the count $T_a$ is set initially (when powered) to a zero, and is reset in a process at a step S114, as will be described. The count $T_a$ is the number of times of execution of unit game, as it is counted. Upon completion of this process, the process flow goes to a step S113.

At the step S113, the CPU 106 judges whether or not the reset flag is "1", as it is set in the process at the step S96 in FIG. 8. If the reset flag is "1" ('Yes' at the step S113), then in the above-noted process at the step S114, the CPU 106 resets the count $T_a$.

Namely, the count $T_a$ of unit game is reset by a payout to be made to a player for aligned special symbols on the payline L1, with a great monetary value of 60 pieces or more per one piece of credit, or by "JOKER" symbols aligned on the payline L1. Further, at a step S115, the CPU 106 sets the reset flag to "0".

Unless the reset flag is judged to be "1" in the decision process at the step S113, the present process goes to an end. That is, unless the reset flag is "1", the count $T_a$ remains incremented, while the process flow will be called for a subsequent unit game. Thereafter, the present process goes to an end.

Figure 10:
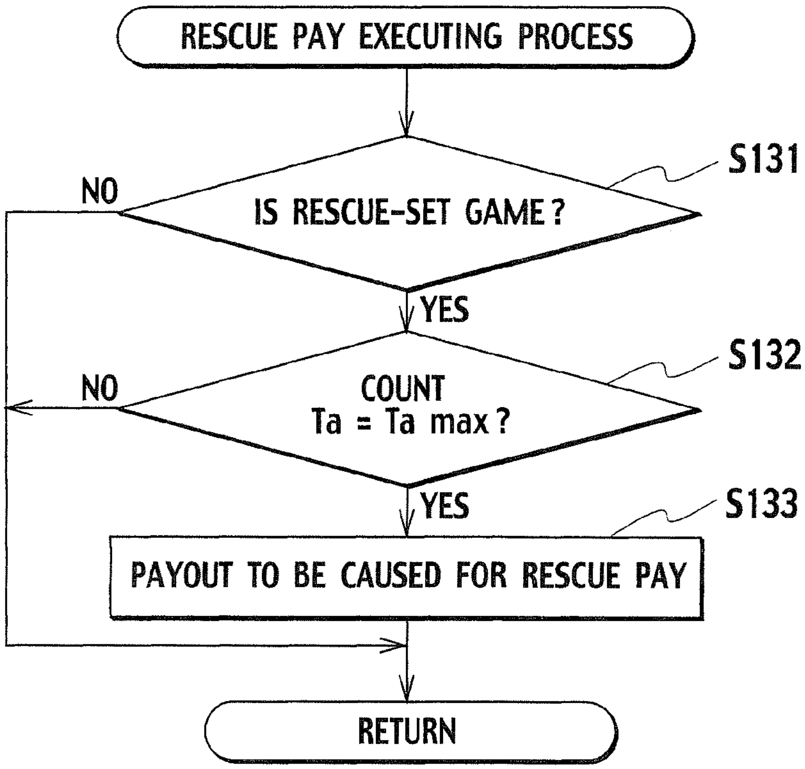
FIG. 10 is a flowchart of procedure of a process of a slot machine according to an embodiment of the present invention.

Description is now made of a procedure as a control flow of the rescue pay executing process at the step S36 in FIG. 5, with reference to the flowchart of FIG. 10. First, at a step S131, the CPU 106 judges whether or not the present unit game is a rescue-set game. Namely, there is a judgment as to whether or not it is a unit game set as a rescue-set game in the process at the step S73 in FIG. 7. If it is a rescue-set game, the process flow goes to a step S132. Unless it is a rescue-set game, the present process goes to an end.

At the step S132, the CPU 106 judges whether or not the count $T_a$ of unit game is an upper limit $T_a$max (e.g., $T_a$max=1,000) preset therefor. If $T_a = T_a$max, the process flow goes to a step S133. Unless $T_a = T_a$max, the present process goes to an end.

At the step S133, the CPU 106 sets a flag for a payout to be caused for rescue pay. That is, a rescue pay is to occur, if special symbols are not aligned on the payline L1 in the way of a number of consecutive times of execution of unit game corresponding to the upper limit $T_a$max of the count $T_a$, and "JOKER" symbols are not aligned on the payline L1 during that interval of time, either.

Figure 17A:
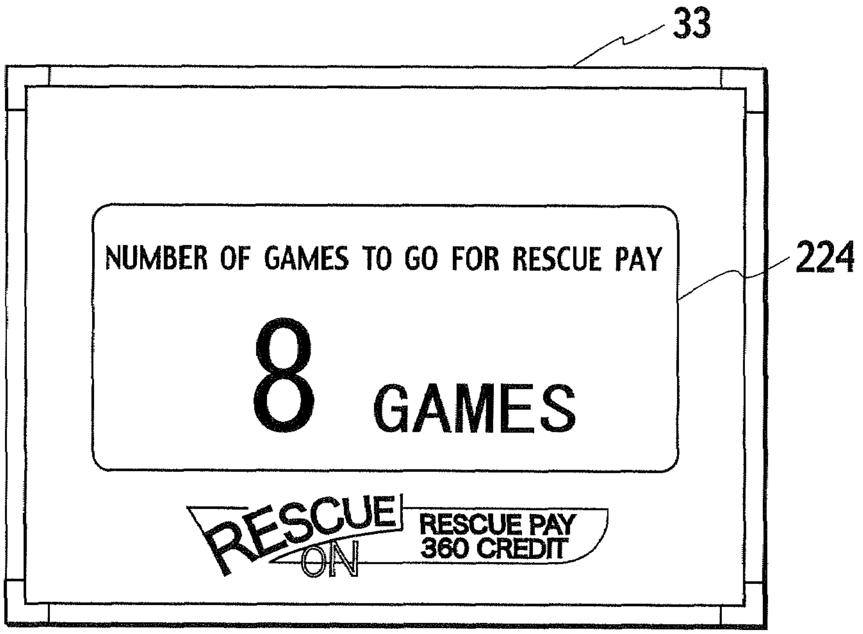
FIG. 17A and FIG. 17B are illustrations of a liquid crystal display of a slot machine according to an embodiment of the present invention.
Figure 17B:
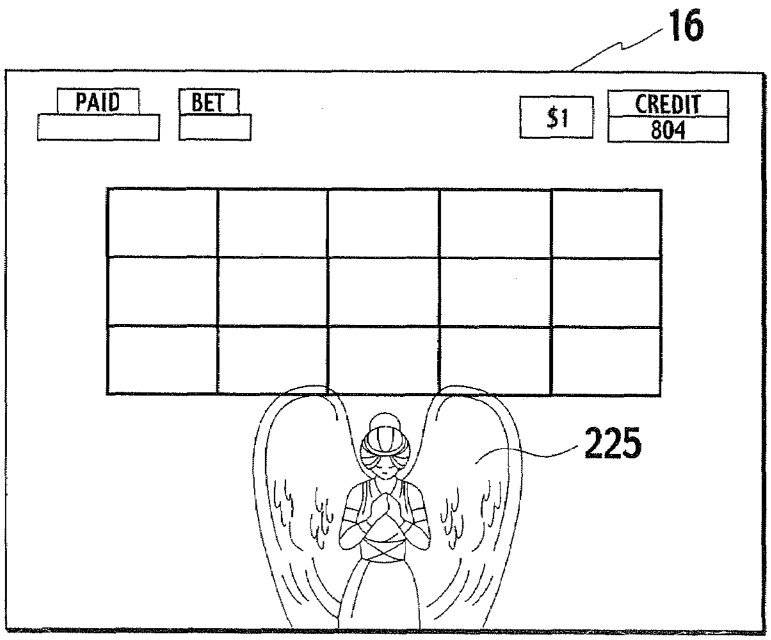

FIG. 17A and FIG. 17B illustrate exemplary image frames to be displayed on the upper LCD 33 and the lower LCD 16, respectively, as the count $T_a$ approaches the upper limit $T_a$max. For a count $T_a$ of "992", the upper LCD 33 displays an image frame 224 informing the player of the number of games to go for a rescue pay, as it is eight. The lower LCD 16 displays an image frame 225 of an angel with folded wings. Then, the lamp 30 shown in FIG. 2 is controlled by the lamp driver 129, for a rotary display to notify the player, as well as those around, of an occurrence of rescue pay coming on.

Figure 18A:
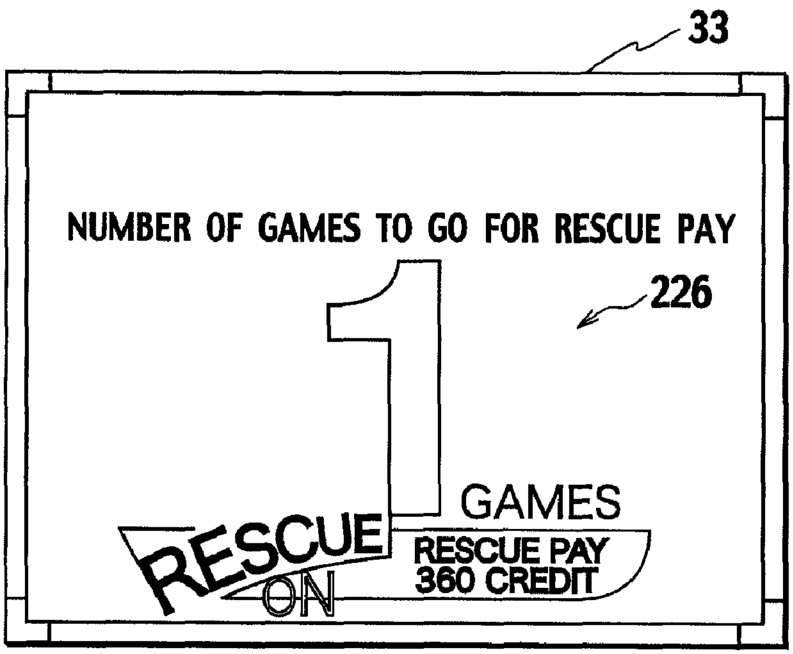
FIG. 18A and FIG. 18B are illustrations of a liquid crystal display of a slot machine according to an embodiment of the present invention.
Figure 18B:
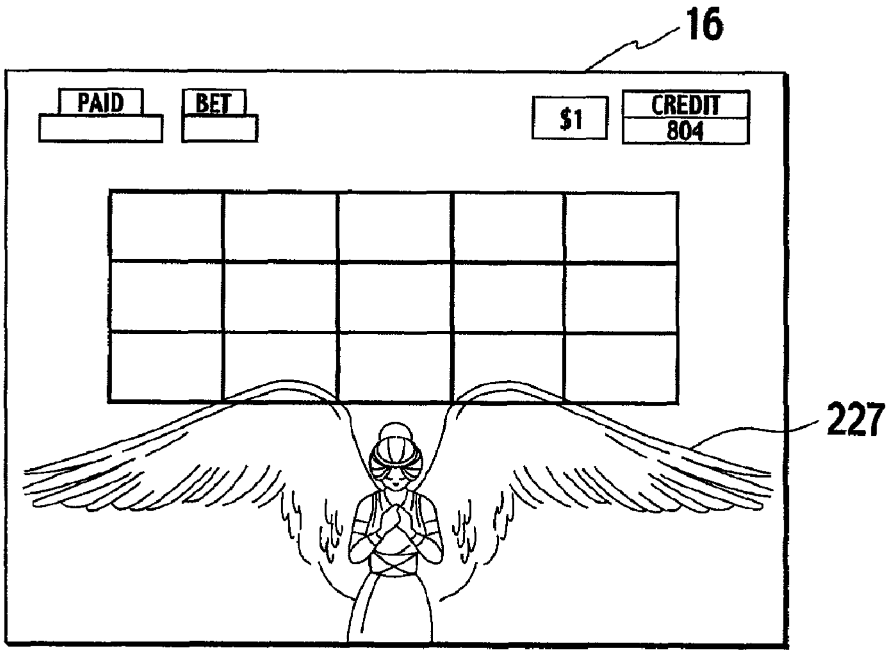

FIG. 18A and FIG. 18B illustrate exemplary image frames to be displayed for a count $T_a$ of "999" on the upper LCD 33 and the lower LCD 16, respectively. The upper LCD 33 displays an image frame 226 informing the player of the number of games to go for a rescue pay, as it is one. The lower LCD 16 displays an image frame 227 of an angel with spread wings. Then, the lamp 30 has an accelerated rotary display to notify the player, as well as those around, of getting hot at an occurrence of rescue pay.

Figure 19A:
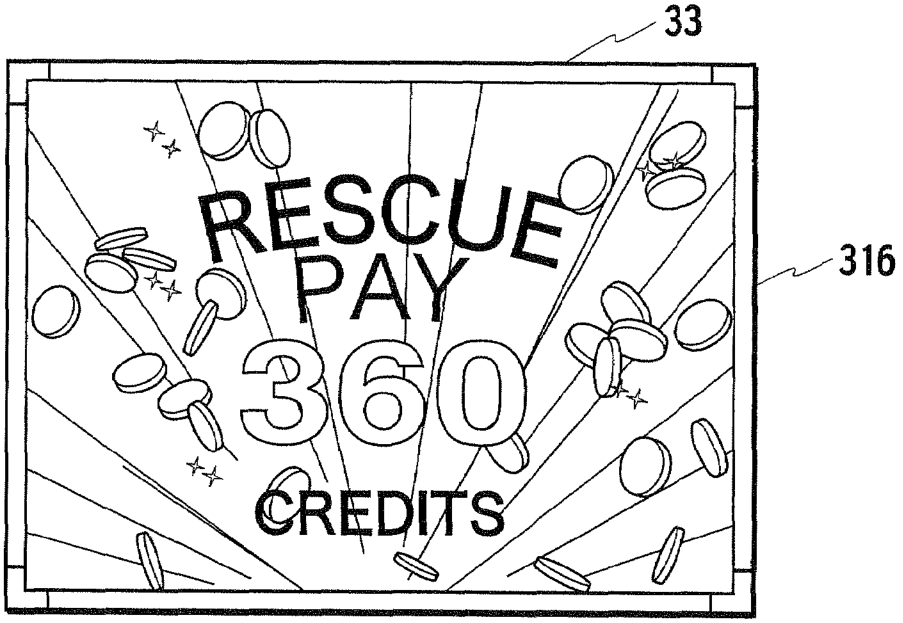
FIG. 19A and FIG. 19B are illustrations of a liquid crystal display of a slot machine according to an embodiment of the present invention.
Figure 19B:
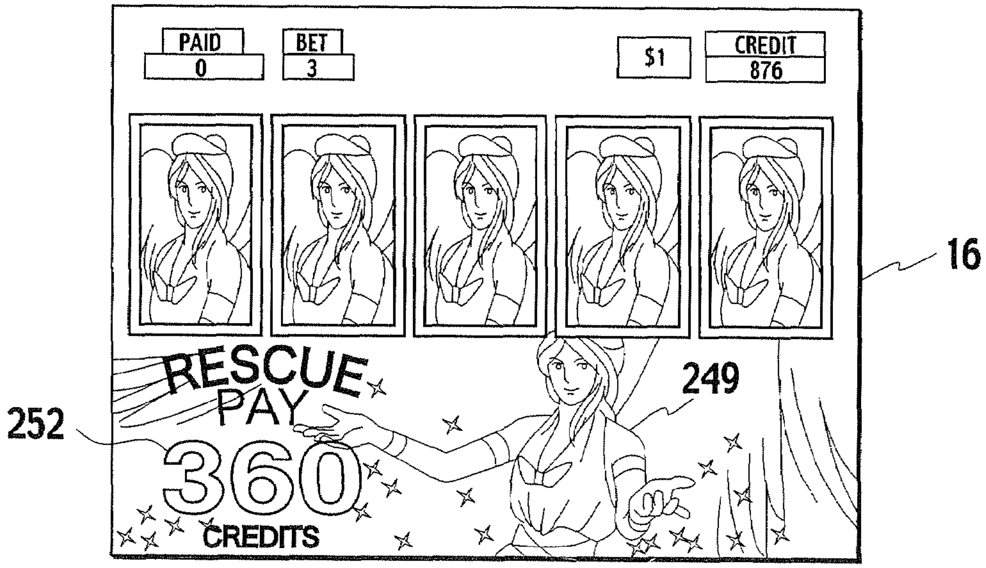

FIG. 19A and FIG. 19B illustrate exemplary image frames to be displayed on the upper LCD 33 and the lower LCD 16, respectively, for a count $T_a$ having reached "1000" as the upper limit $T_a$max. The upper LCD 33 displays an image frame 316 indicating an occurrence of rescue pay equivalent to 360 pieces of medal. The lower LCD 16 displays an image frame 249 of an angle with open arms spilling starts out. Then, the lamp 30 goes flushing to notify the occurrence of rescue pay to the player, as well as those around.

Figure 11:
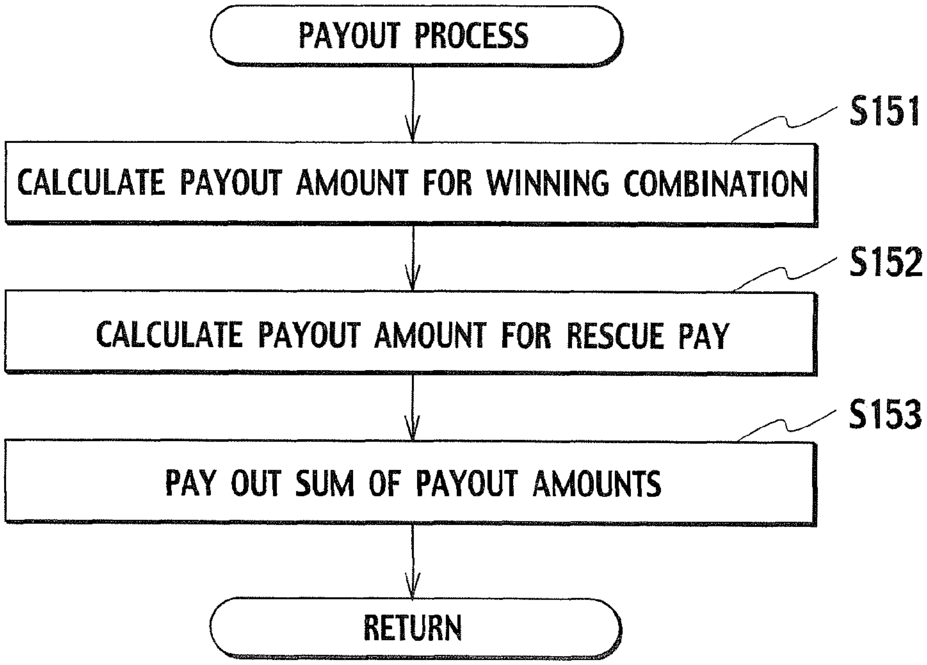
FIG. 11 is a flowchart of procedure of a process of a slot machine according to an embodiment of the present invention.

Description is now made of the payout process at the step S37 in FIG. 5, with reference to the flowchart of FIG. 11. First, at a step S151, the CPU 106 calculates a payout amount for alignment of a winning combination. More specifically, it calculates the amount for a payout to be caused by the flag set therefor through the processes at the steps S94 and S95 in FIG. 8. The flag is then reset, and the process flow goes to a step S152.

At the step S152, the CPU 106 calculates a payout amount for a rescue pay. Namely, it calculates the amount for a payout to be caused by the flag set therefor in the process at step S133 in FIG. 10. In this embodiment, the amount payable for rescue pay corresponds to, e.g., 360 pieces of medal. The flag is then reset, and the process flow goes to a step S153.

Figure 2:
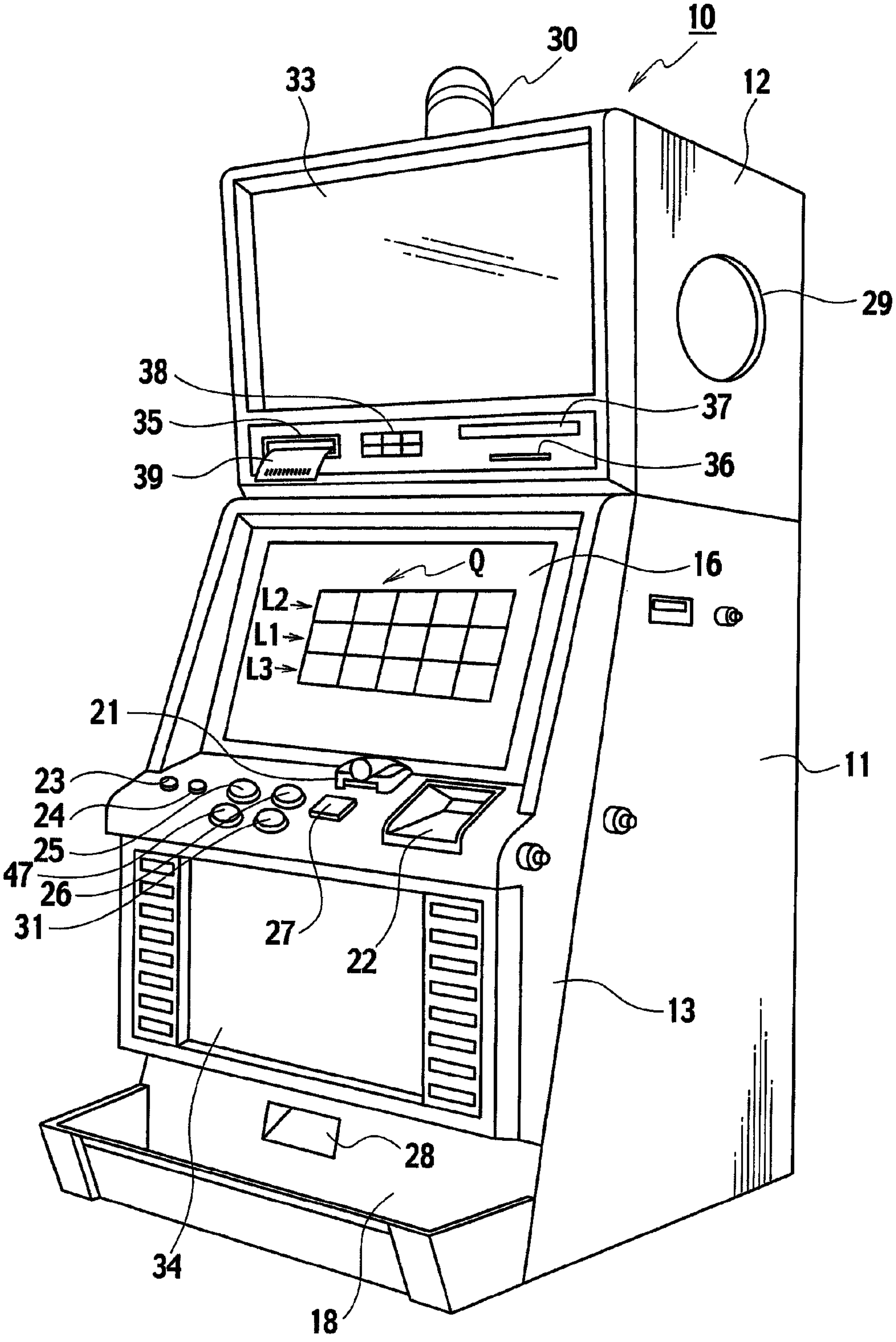
FIG. 2 is a perspective view of a slot machine according to an embodiment of the present invention.

At the step S153, the CPU 106 calculates a sum of the payout amount for the winning combination and the payout amount for the rescue pay, and outputs a command for a payout of a monetary value corresponding thereto to be made by medals or coins through the medal payout port 28 shown in FIG. 2. Thereafter, the present process goes to an end.

Such being the case, the slot machine 10 according to the present mode of embodiment performs a payout of rescue pay for a count $T_a$ having reached a prescribed upper limit $T_a$max in a rescue-set game.

In the foregoing mode of embodiment, the counter 128 has a count thereof incremented every time of execution of a unit game. However, such a count may well be incremented in accordance with a total amount of monetary value (medal, credit, etc.) bet by a player or players. In this case, a rescue pay may occur depending on the number of consumed pieces of monetary value.

In the foregoing mode of embodiment, the count $T_a$ is not incremented, unless the unit game is a rescue-set game, at the step S111 as a sub-process of the unit game counting process shown in FIG. 9. However, the count $T_a$ may well be incremented every unit game.

Figure 12:
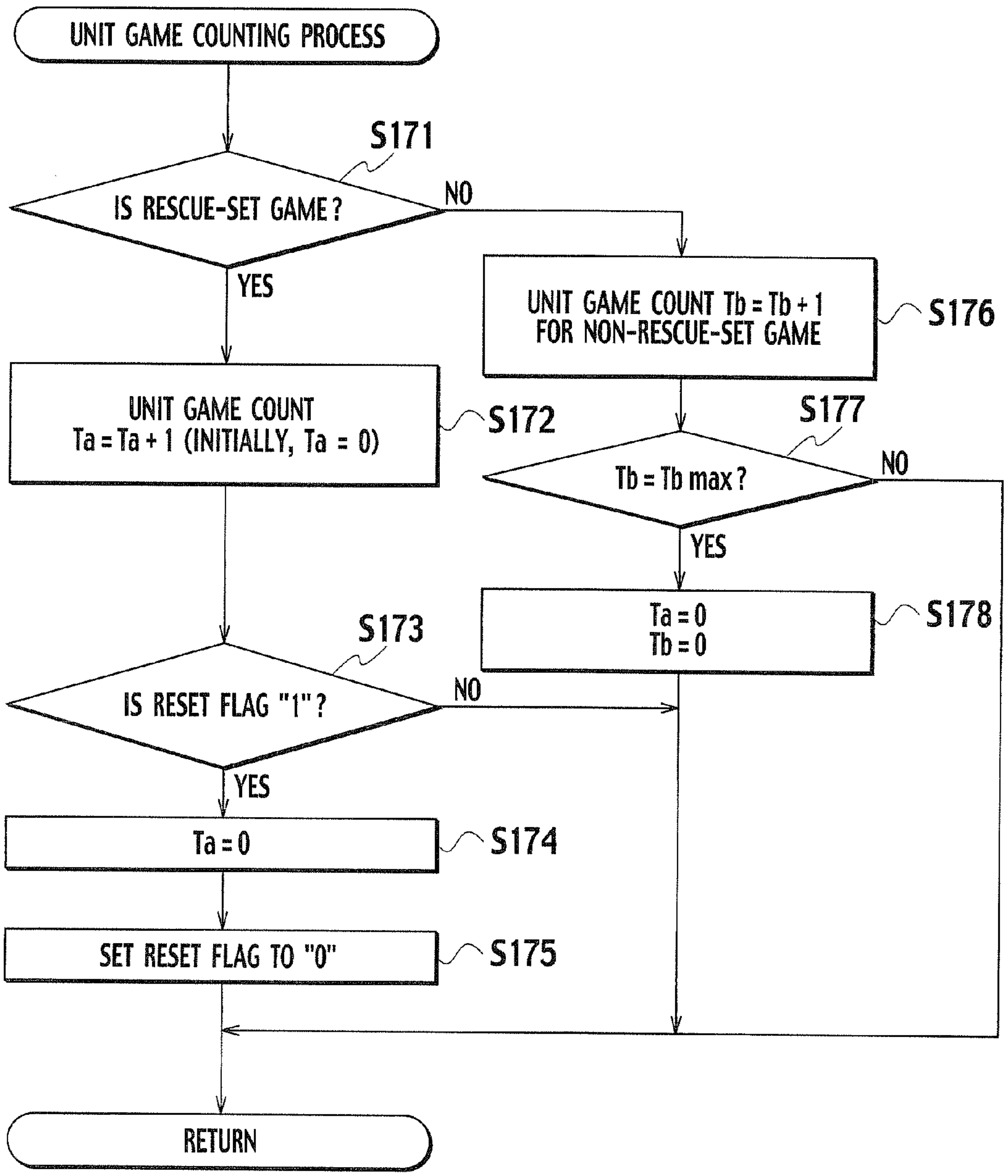
FIG. 12 is a flowchart of procedure of a process of a slot machine according to an embodiment of the present invention.

Description is now made of a modification of the first mode of embodiment of the present invention, where the unit game counting process shown in FIG. 9 of the first mode of embodiment is modified. There will be described a unit game counting process according to the modification, with reference to a flowchart of FIG. 12.

First, at a step S171, the CPU 106 judges whether or not this unit game is a rescue-set game. Namely, there is a judgment as to whether or not it is set as a rescue-set game in the process at the step S73 in FIG. 7. If it is a rescue-set game, the process flow goes to a step S172. Unless it is a rescue-set game, the process flow goes to a step S176.

At the step S172, the CPU 106 increments the count made of unit games. That is, letting $T_a$ be the count of a unit game, it so follows that $T_a=T_a+1$. It is noted that the count $T_a$ is set initially (when powered) to a zero, and is reset in a process at a step S174, as will be described. The count $T_a$ is the number of times of execution of unit game, as it is counted. Upon completion of this process, the process flow goes to a step S173.

At the step S173, the CPU 106 judges whether or not the reset flag is "1", as it is set in the process at the step S96 in FIG. 8. If the reset flag is "1" ('Yes' at the step S173), then in the above-noted process at the step S174, the CPU 106 resets the count $T_a$.

Namely, the count $T_a$ of unit game is reset by a payout to be made to a player for aligned special symbols on the payline L1, with a great monetary value of 60 pieces or more per one piece of credit, or by "JOKER" symbols aligned on the payline L1. Further, at a step S175, the CPU 106 sets the reset flag to "0".

Unless the reset flag is judged to be "1" in the decision process at the step S173, the present process goes to an end. That is, unless the reset flag is "1", the count $T_a$ remains incremented, while the process flow will be called for a subsequent unit game. Thereafter, the present process goes to an end.

On the other hand, at the step S176, the CPU 106 increments a count $T_b$ made of unit games else than rescue-set games. Thereafter, the process flow goes to a step S177.

At the step S177, the CPU 106 judges whether or not the count $T_b$ has reached an upper limit $T_b$max (e.g., $T_b$max=5). If $T_b=T_b$max, the CPU 106 resets the counts $T_a$ and $T_b$ at a step S178. Namely, the count $T_a$ of unit game is reset, when $T_b$max is reached by the number of consecutive times of execution of any unit game else than set as a rescue-set game.

Figure 13:
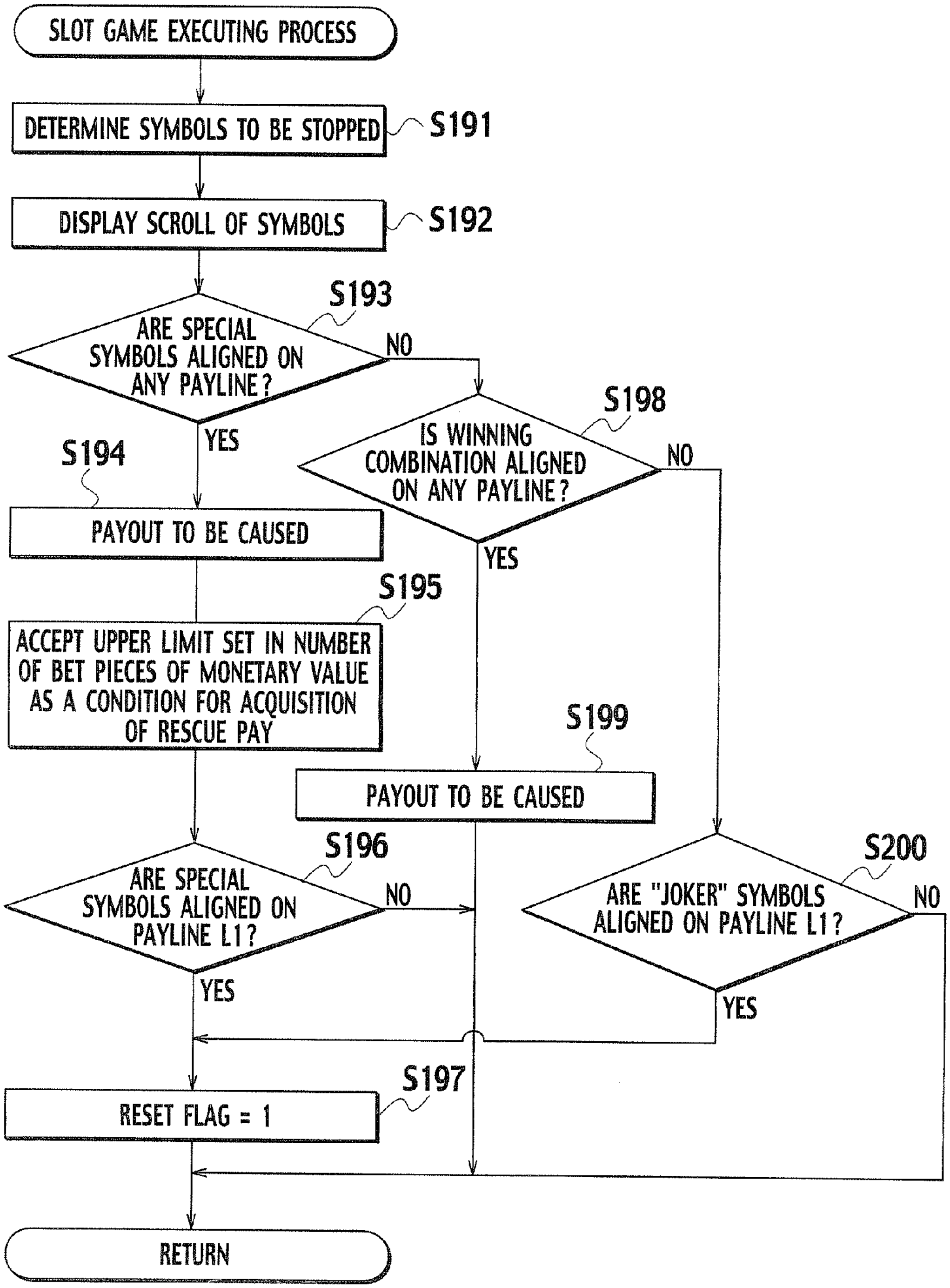
FIG. 13 is a flowchart of procedure of a process of a slot machine according to an embodiment of the present invention.

Description is now made of a gaming machine according to a second mode of embodiment of the present invention, where, in comparison with the first mode of embodiment, simply the slot game executing process at the step S34 in FIG. 5 is changed. There will be described a slot game executing process according to the second mode of embodiment, with reference to a flowchart of FIG. 13.

First, at a step S191, the CPU 106 determines symbols to be stopped on three rows by five columns of a total number of fifteen display regions Q, depending on a random number generated by the random number generator 112 (refer to FIG. 3). Then, at a step S192, it displays scroll of symbols on the display regions Q for a prescribed time (e.g., five seconds), and thereafter, has stopped symbols displayed thereon. The symbols to be stopped are those determined at the step S191. Thereafter, the process flow goes to a step S193.

At the step S193, the CPU 106 judges whether or not special symbols are aligned on any one of an upper payline L2, a central payline L1, and a lower payline L3 set on the three rows by five columns of display regions Q. Aligned special symbols constitute a winning combination that causes a monetary value equivalent to, e.g., sixty pieces of medal to be paid out to a bet monetary value equivalent to one piece of medal.

FIG. 16 shows the payout table in which winning combinations are specified. In this embodiment, the "DOUBLE" symbol and the "triple BAR" symbol are each respectively referred to a special symbol. If special symbols are aligned on any one of paylines L1 to L3, the process flow goes to a step S194. Unless special symbols are aligned on any one of paylines L1 to L3, the process flow goes to a step S198.

At the step S194, the CPU 106 sets a flag for a payout to be caused by aligned special symbols on any one of paylines L1 to L3. Thereafter, the process flow goes to a step S195.

At the step S195, the CPU 106 accepts a setting of an upper limit in number of pieces of monetary value bettable for rescue pay in a single unit game, for example. Namely, it establishes a condition that permits a player's own operation, such as an input by a touch to the touch panel 19 (refer to FIG. 3), to set the upper limit in number of pieces of monetary value for rescue pay. When a number therefor is input by the player, this number is set as an upper limit in number of pieces of monetary value bettable for rescue pay. For example, there is an operation to select one of "3", "5", and "10", as the upper limit in number of pieces of monetary value bettable for rescue pay in a single unit game. Upon completion of this process, the process flow goes to a step S196.

At the step S196, it is judged whether or not the special symbols are aligned on the central payline L1 among paylines L1 to L3. If those special symbols are aligned on the central payline L1, the process flow goes to a step S197. Unless the special symbols are aligned on the central payline L1, that is, if those special symbols are aligned on either upper payline L2 or lower payline L3, the present process goes to an end.

At the step S197, a reset flag is set to "1", for resetting the number of times of execution of unit game counted by the counter 128 (refer to FIG. 3). Thereafter, the present process goes to an end.

In other words, along a flow of processes at steps S194 to S197, there is set an upper limit in number of pieces of monetary value for rescue pay, as it is determined by the player's own operation. Further, if special symbols are aligned on any one of paylines L1 to L3, the CPU 106 provides for a payout to be caused by the aligned special symbols, and simply when the special symbols are aligned on the central payline L1, it sets the reset flag to "1".

On the other hand, at the step S198, the CPU 106 judges whether or not a winning combination is aligned on any one of paylines L1 to L3. Namely, it is judged whether or not a winning combination of symbols else than special symbols is aligned. If a winning combination is aligned, then at a step S199, the CPU 106 sets a flag for a payout to be caused by the winning combination. For example, if five "CHERRY" symbols are aligned on any one of paylines L1 to L3, the CPU 106 provides for a payout of a monetary value equivalent to 20 pieces of medal per one piece of credit. Unless a winning combination is aligned on any one of paylines L1 to L3, the process flow goes to a step S200.

At the step S200, the CPU 106 judges whether or not "JOKER" symbols are aligned on the payline L1. As shown in the payout table of FIG. 16, aligned "JOKER" symbols constitute a reset trigger, which makes the process flow go to the step S197, where the reset flag is set to "1". Namely, aligned "JOKER" symbols on the payline L1 cause no payout, and set the reset flag to "1" to reset the number of times of execution of unit game counted by the counter 128 (refer to FIG. 3). Thereafter, the present process goes to an end.

Figure 14:
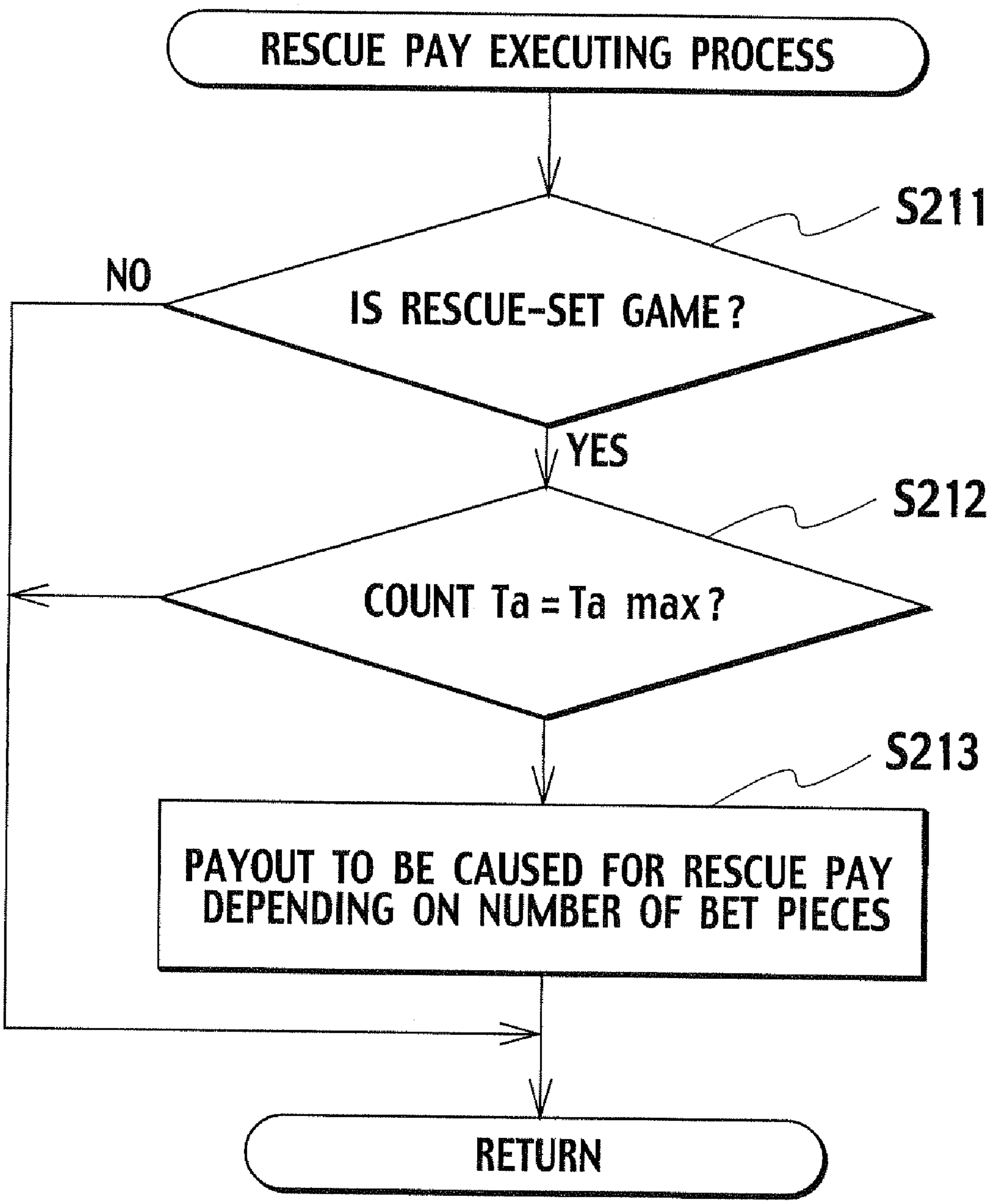
FIG. 14 is a flowchart of procedure of a process of a slot machine according to an embodiment of the present invention.

Description is now made of a gaming machine according to a third mode of embodiment of the present invention, where, in comparison with the first mode of embodiment, simply the rescue pay executing process at the step S36 in FIG. 5 is changed. There will be described a rescue pay executing process according to the third mode of embodiment, with reference to a flowchart of FIG. 14.

First, at a step S211, the CPU 106 judges whether or not the present unit game is a rescue-set game. Namely, there is a judgment as to whether or not it is a unit game set as a rescue-set game in the process at the step S73 in FIG. 7. If it is a rescue-set game, the process flow goes to a step S212. Unless it is a rescue-set game, the present process goes to an end.

At the step S212, the CPU 106 judges whether or not the count $T_a$ of unit game is an upper limit $T_a$max (e.g., $T_a$max=1,000) preset therefor. If $T_a=T_a$max, the process flow goes to a step S213. Unless $T_a=T_a$max, the present process goes to an end.

At the step S213, the CPU 106 sets a flag for a payout to be caused for rescue pay. That is, a rescue pay is to occur, if special symbols are not aligned in the way of a number of consecutive times of execution of unit game corresponding to the upper limit $T_a$max of the count $T_a$, and "JOKER" symbols are not aligned during that interval of time, either.

More specifically, at the step S213, the CPU 106 provides for a payout to be made by an amount corresponding to a bet monetary value for rescue pay. That is, the CPU 106 is programmed so that, upon an occurrence of rescue pay, the amount then payable in number of pieces of monetary value gets greater if, in the process at the step S71 in FIG. 7, the number of pieces of monetary value bet for rescue pay is, e.g., "3" in a single game, than for "2". In other words, the payout amount for rescue pay becomes greater, as the monetary value bet for rescue pay is greater. Upon completion of this process, the present process goes to an end.

Figure 15:
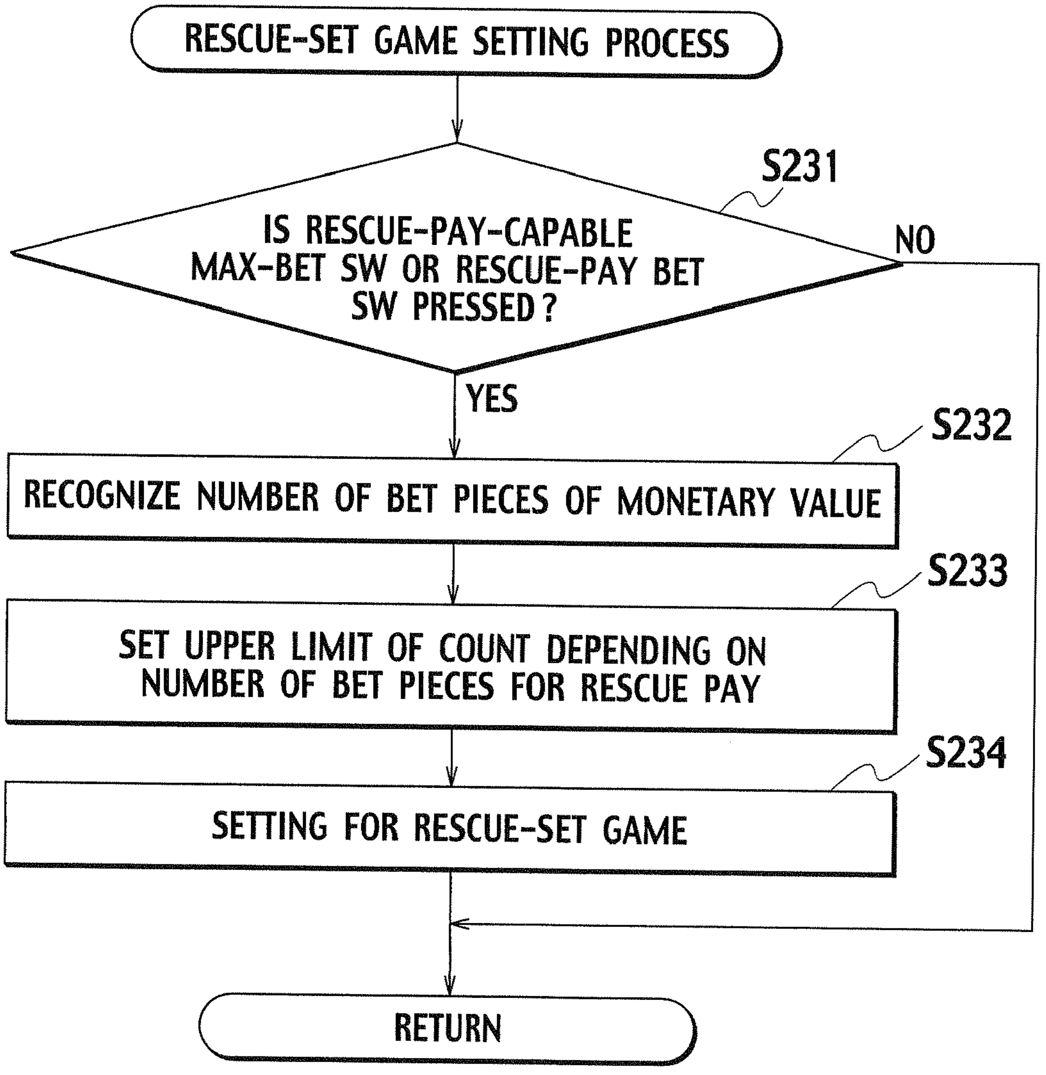
FIG. 15 is a flowchart of procedure of a process of a slot machine according to an embodiment of the present invention.

Description is now made of a gaming machine according to a fourth mode of embodiment of the present invention, where, in comparison with the first mode of embodiment, simply the rescue-set game setting process at the step S32 in FIG. 5 is changed. There will be described a rescue-set game setting process according to the fourth mode of embodiment, with reference to a flowchart of FIG. 15.

First, at a step S231, the CPU 106 judges whether or not the rescue-pay-capable max-bet switch 26 or the rescue-pay bet switch 31 is pressed. If the rescue-pay-capable max-bet switch 26 or the rescue-pay bet switch 31 is then pressed, the process flow goes to a step S232. At the step S232, the CPU 106 recognizes a number of bet pieces of monetary value for rescue pay. That is, the CPU 106 recognizes a monetary value equivalent to, e.g., one piece of medal as a bet for rescue pay, if the rescue-pay-capable max-bet switch 26 is pressed. If the rescue-pay bet switch 31 is pressed, the monetary value to be recognized as a bet for rescue pay depends on the number of times the rescue-pay bet switch 31 is pressed. Thereafter, the process flow goes to a step S233.

At the step S233, the CPU 106 sets an upper limit $T_a$max of the count $T_a$ for occurrence of a rescue pay, depending on the number of bet pieces of monetary value for rescue pay. For example, the upper limit $T_a$max is set to "1,000" if the number of pieces to be bet for rescue pay every unit game is "2", or to "1,500" if it is "3".

Then, at a step S234, the CPU 106 sets this unit game as a rescue-set game. Thereafter, the present process goes to an end.

There have been described slot machines according to embodiments of the present invention, which are mere illustration of specific examples, and in no way constitute a limitation to the present invention, so that specific configurations of respective measures can be designed or modified in an adequate manner. The embodiments of the present invention have described effects, which are simply enumerated as most preferable effects occurring from the embodiments, while the invention has effects thereof encompassing those described in the embodiments, without limitation thereto.

What is claimed is:

1. A gaming machine capable of a bet of monetary value as a condition for acquisition of an insurance pay, comprising:

a display configured to display an image associated with a unit game for determination of whether or not a play result for a payout is to be given;

a counter configured to be reset under a prescribed condition, and to increment a count value along with execution of the unit game;

an upper limit setting switch configured to set an upper limit of a number of bet pieces of monetary value as a condition for acquisition of an insurance pay in the unit game; and a controller operable to:

(a) pay out a prescribed number of pieces of monetary value for the play result of the unit game to be a special play result;

(b) accept, within a range of the upper limit of the number of bet pieces, a bet of monetary value as the condition for acquisition of the insurance pay; and (c) give the insurance pay for the count value having reached a preset upper limit count value in the unit game having the bet of monetary value as the condition for acquisition of the insurance pay.

2. A gaming machine capable of a bet of monetary value as a condition for acquisition of an insurance pay, comprising:

a display configured to display an image associated with a unit game for determination of whether or not a play result for a payout is to be given;

a counter configured to be reset under a prescribed condition, and to increment a count value along with execution of the unit game;

an upper limit setting switch configured to set an upper limit of a number of bet pieces of monetary value as a condition for acquisition of an insurance pay in the unit game; and a controller operable to:

(a) pay out a prescribed number of pieces of monetary value for the play result of the unit game to be a special play result;

(b) make a setting operation of the upper limit by the upper limit setting switch effective under a condition of a special key operation;

(c) accept, within a range of the upper limit of the number of bet pieces, a bet of monetary value as the condition for acquisition of the insurance pay; and (d) give the insurance pay for the count value having reached a preset upper limit count value in the unit game having the bet of monetary value as the condition for acquisition of the insurance pay.

3. A gaming machine capable of a bet of monetary value as a condition for acquisition of an insurance pay, comprising:

a display configured to display an image associated with a unit game for determination of whether or not a play result for a payout is to be given;

a counter configured to be reset under a prescribed condition, and to increment a count value along with execution of the unit game;

an upper limit setting switch operable by a player and configured to set an upper limit of a number of bet pieces of monetary value as a condition for acquisition of an insurance pay in the unit game; and a controller operable to:

(a) pay out a prescribed number of pieces of monetary value for the play result of the unit game to be a special play result;

(b) accept, within a range of the upper limit of the number of bet pieces, a bet of monetary value as the condition for acquisition of the insurance pay; and (c) give the insurance pay for the count value having reached a preset upper limit count value in the unit game having the bet of monetary value as the condition for acquisition of the insurance pay.

4. A gaming machine capable of a bet of monetary value as a condition for acquisition of an insurance pay, comprising:

a display configured to display an image associated with a unit game for determination of whether or not a play result for a payout is to be given;

a counter configured to be reset under a prescribed condition, and to increment a count value along with execution of the unit game;

and a controller operable to:

(a) pay out a prescribed number of pieces of monetary value for the play result of the unit game to be a special play result;

(b) accept a bet of an arbitrary number of pieces of monetary value as a condition for acquisition of an insurance pay;

(c) determine an upper count value at the counter depending on the number of bet pieces of monetary value as the condition for acquisition of the insurance pay; and (d) give the insurance pay to pay out a number of pieces of monetary value depending on the number of bet pieces of monetary value as the condition for acquisition of the insurance pay for the count value having reached the upper limit count value in the unit game having the bet of monetary value as the condition for acquisition of the insurance pay.

5. The gaming machine capable of a bet of monetary value as a condition for acquisition of an insurance pay, as claimed in claim 4, wherein the controller is adapted to have the upper limit count value set greater, as the number of bet pieces of monetary value as the condition for acquisition of the insurance pay is greater.

* * * * *